US008918619B2

(12) United States Patent (10) Patent No.: US 8,918,619 B2
Yochai et al. (45) Date of Patent: Dec. 23, 2014

(54) VIRTUALIZED STORAGE SYSTEM AND METHOD OF OPERATING THEREOF

(75) Inventors: Yechiel Yochai, D.N. Menashe (IL); Haim Kopylovitz, Herzliya (IL); Leo Corry, Ramat Gan (IL)

(73) Assignee: Infinidat Ltd., Herzliya (IL)

( * ) Notice: Subject to any disclaimer, the term of this patent is extended or adjusted under 35 U.S.C. 154(b) by 1116 days.

(21) Appl. No.: 12/897,119

(22) Filed: Oct. 4, 2010

(65) Prior Publication Data

US 2011/0082997 A1 Apr. 7, 2011

Related U.S. Application Data

(63) Continuation-in-part of application No. PCT/IL2010/000124, filed on Feb. 11, 2010.

(60) Provisional application No. 61/248,462, filed on Oct. 4, 2009.

(51) Int. Cl.
 *G06F 12/00* (2006.01)
 *G06F 3/06* (2006.01)
(52) U.S. Cl.
 CPC ............ *G06F 3/0605* (2013.01); *G06F 3/0665* (2013.01); *G06F 3/0689* (2013.01)
 USPC ............................. 711/202; 711/154; 711/200
(58) Field of Classification Search
 CPC .............. G06F 12/109; G06F 12/0292; G06F 12/1009; G06F 2212/651
 USPC .................................. 711/203, 206, 209, 202
 See application file for complete search history.

(56) References Cited

U.S. PATENT DOCUMENTS

| 4,758,946 | A | 7/1988 | Shar et al. |
| 5,392,244 | A | 2/1995 | Jacobson et al. |
| 5,652,854 | A | 7/1997 | Wong |
| 6,807,618 | B1 * | 10/2004 | Kemeny ........................ 711/209 |

(Continued)

OTHER PUBLICATIONS

Heinz, Steffen, Justin Zobel, and Hugh E. Williams. "Burst tries: a fast, efficient data structure for string keys." ACM Transactions on Information Systems (TOIS) 20.2 (2002): 192-223.*

(Continued)

*Primary Examiner* — Tuan Thai
(74) *Attorney, Agent, or Firm* — Oren Reches

(57) ABSTRACT

There are provided a storage system and a method of operating thereof. The method comprises: a) representing to a plurality of hosts an available logical address space divided into one or more logical groups (e.g. logical volumes, virtual partitions, snapshots, combinations of a given logical volume and its respective snapshot(s), etc.), and b) mapping between one or more contiguous ranges of addresses related to the logical address space and one or more contiguous ranges of addresses related to the physical address space, wherein said mapping is provided with the help of one or more mapping trees, each tree assigned to a separate logical group in the logical address space. Mapping between contiguous ranges of addresses related to the logical address space and contiguous ranges of addresses related to the physical address space can be a) mapping between LBA and DBA addresses; b) mapping between VUA and VDA addresses; c) mapping between LBA and VDA addresses; and d) mapping between VUA and DBA addresses, wherein virtual unit addresses (VUA) characterize a first virtual layer operable to represent the logical address space, and virtual disk addresses (VDA) characterize a second virtual layer operable to represent the physical storage space.

18 Claims, 13 Drawing Sheets

(56) References Cited

U.S. PATENT DOCUMENTS

| | | | |
|---|---|---|---|
| 6,889,309 | B1 | 5/2005 | Oliveira et al. |
| 6,898,670 | B2 | 5/2005 | Nahum |
| 6,983,355 | B2 | 1/2006 | Ripberger et al. |
| 6,996,582 | B2 | 2/2006 | Daniels et al. |
| 7,124,275 | B2 | 10/2006 | Gammel et al. |
| 7,386,697 | B1 | 6/2008 | Case et al. |
| 7,702,882 | B2 * | 4/2010 | Wybenga et al. ............. 711/220 |
| 8,625,604 | B2 * | 1/2014 | Bando et al. ............. 370/395.31 |
| 2006/0184565 | A1 | 8/2006 | Nishikawa et al. |
| 2007/0101083 | A1 | 5/2007 | Ogihara et al. |
| 2007/0150690 | A1 | 6/2007 | Chen et al. |
| 2008/0104359 | A1 | 5/2008 | Sauer et al. |
| 2008/0270694 | A1 | 10/2008 | Patterson et al. |
| 2010/0153617 | A1 | 6/2010 | Miroshnichenko et al. |

OTHER PUBLICATIONS

Srinivasan, Venkatachary, and George Varghese. "Fast address lookups using controlled prefix expansion." ACM Transactions on Computer Systems (TOCS) 17.1 (1999): 1-40.*

Sussenguth Jr, Edward H. "Use of tree structures for processing files." Communications of the ACM 6.5 (1963): 272-279.*

Fredkin, Edward. "Trie memory." Communications of the ACM 3.9 (1960): 490-499.*

* cited by examiner

Prior Art

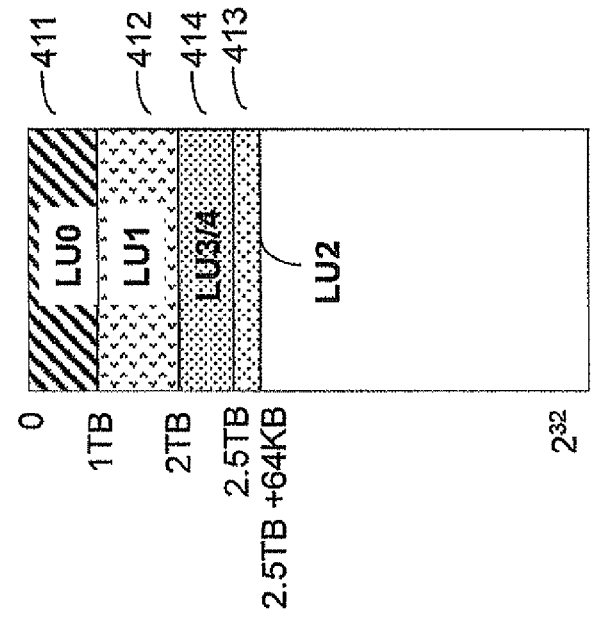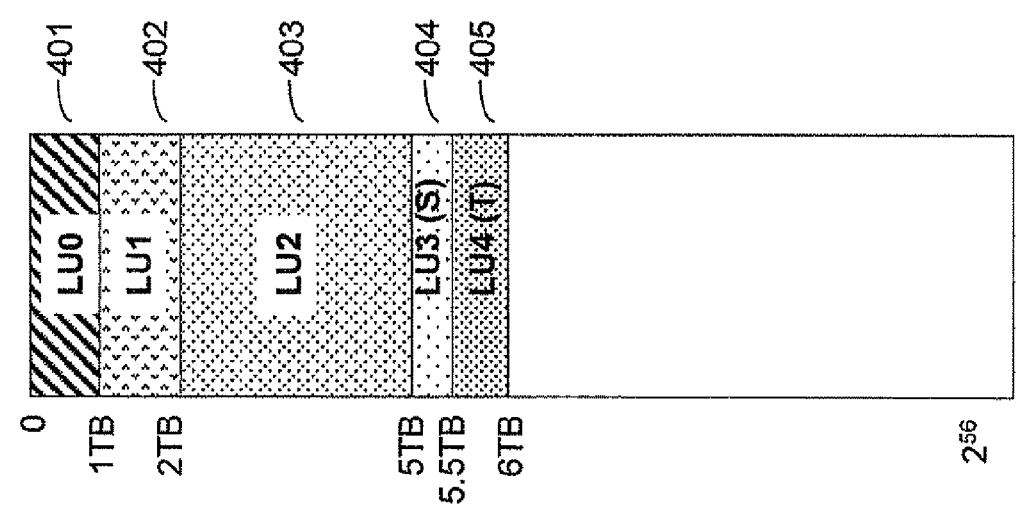
Figure 5

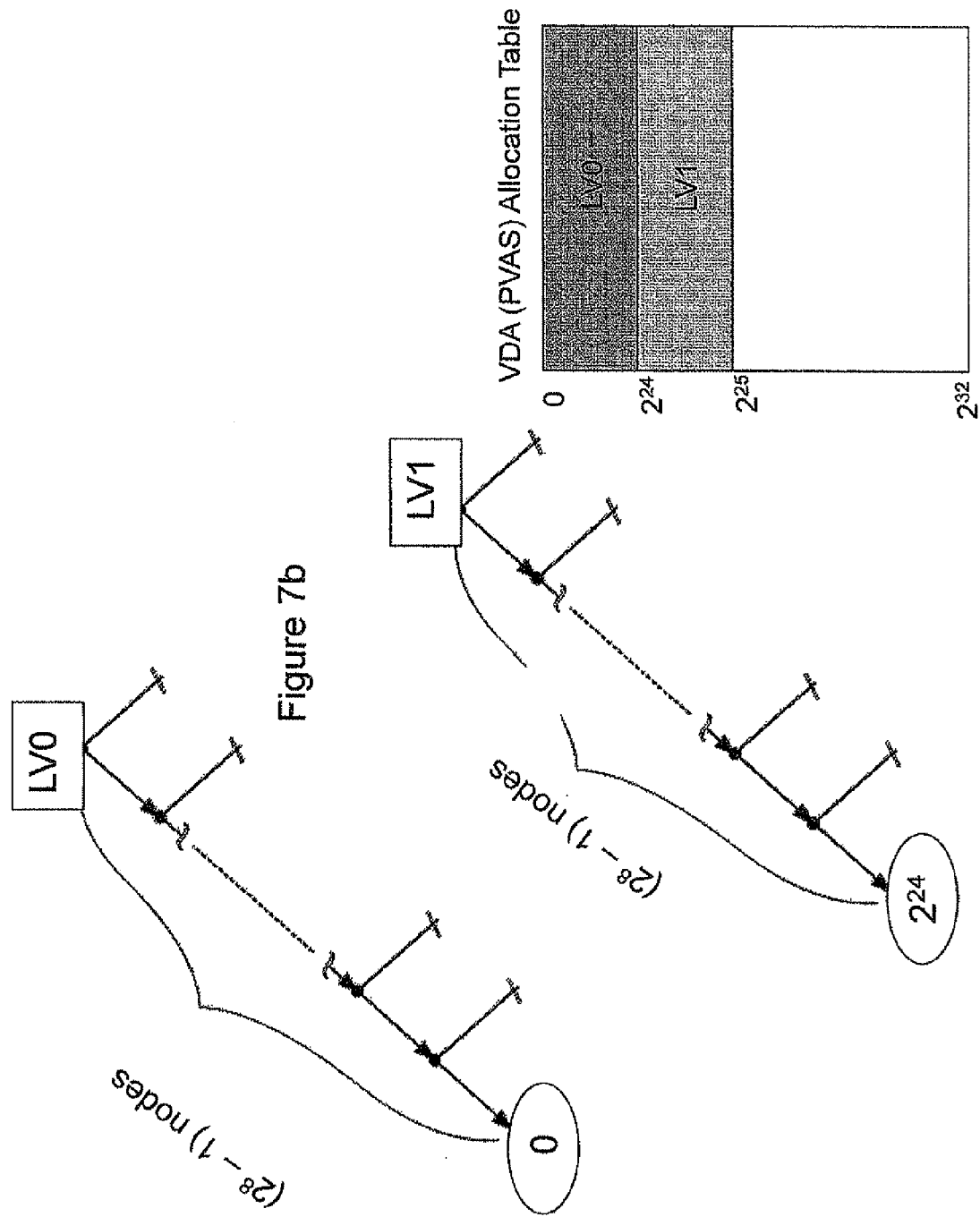

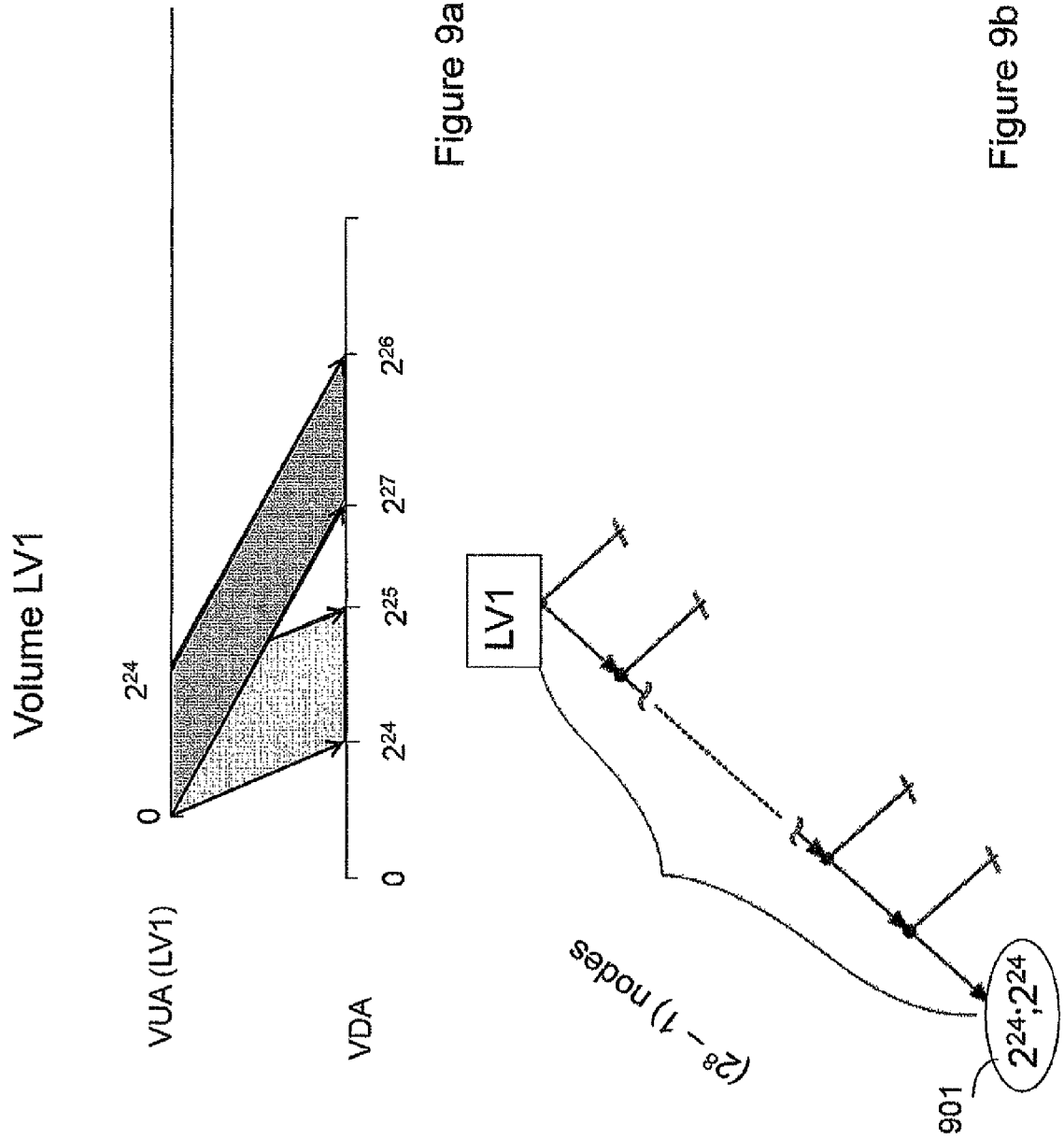

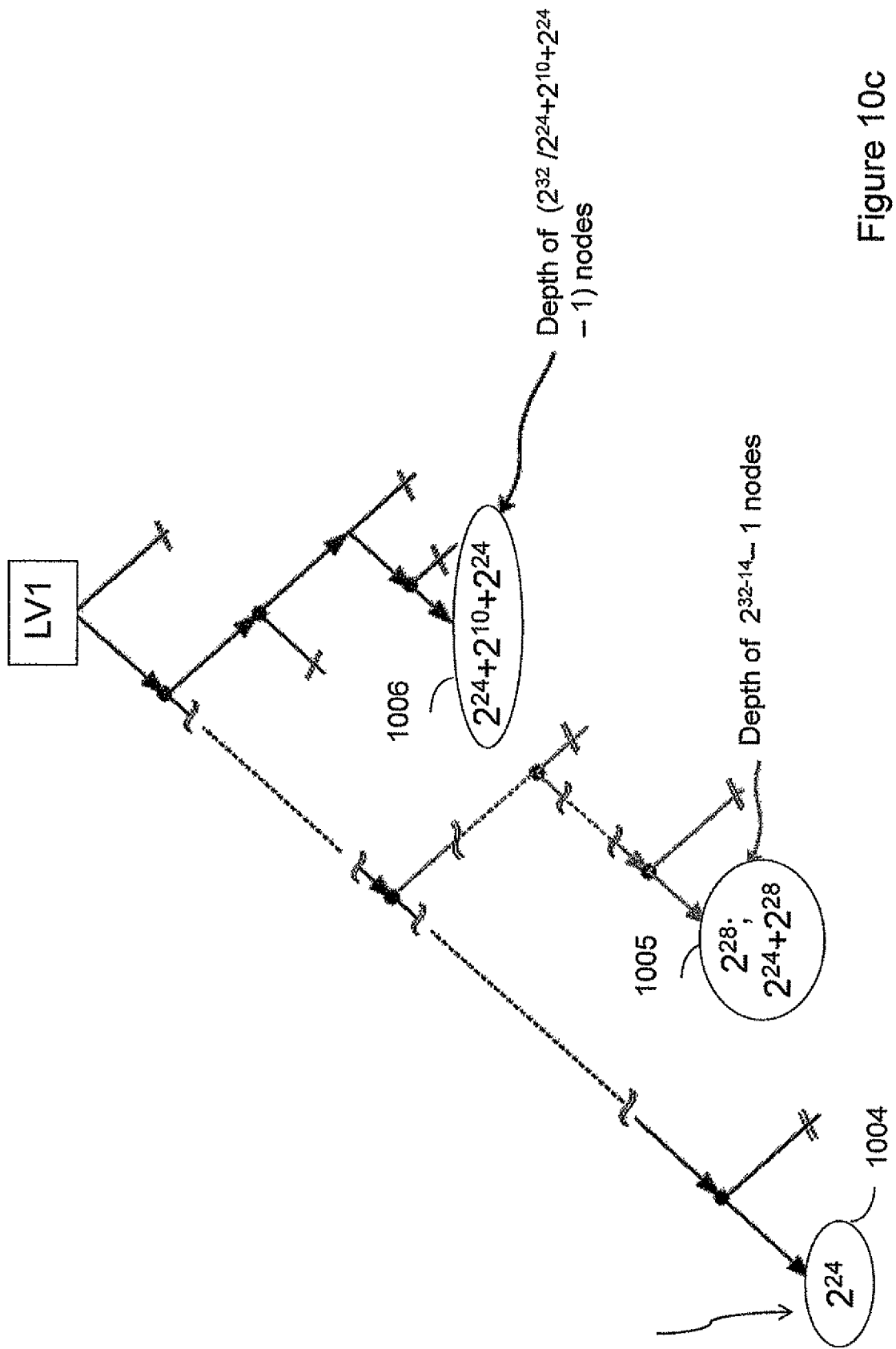

VIRTUALIZED STORAGE SYSTEM AND METHOD OF OPERATING THEREOF

CROSS-REFERENCES TO RELATED APPLICATIONS

This application is a continuation-in-part application of PCT application No. PCT/IL2010/000124, filed on Feb. 11, 2010 and also claims priority from U.S. Provisional Patent Application No. 61/248,642 filed on Oct. 4, 2009, both applications incorporated herein by reference in their entirety.

FIELD OF THE INVENTION

The present invention relates, in general, to data storage systems and respective methods for data storage, and, more particularly, to virtualized storage systems and virtualized storage system operational methods.

BACKGROUND OF THE INVENTION

The growing complexity of storage infrastructure requires solutions for efficient use and management of resources. Storage virtualization enables administrators to manage distributed storage as if it were a single, consolidated resource. Storage virtualization helps the storage administrator to perform the tasks of resource allocation, backup, archiving and recovery more easily and in less time, by disguising the actual complexity of the storage systems (including storage network systems).

A virtualized storage system presents to a user a logical space for data storage and itself handles the process of mapping it to the actual physical location. The virtualized storage system may include modular storage arrays and a common virtual storage space enabling organization of the storage resources as a single logical pool available to users under a common management. For further fault tolerance, the storage systems may be designed as spreading data redundantly across a set of storage-nodes and enabling continuous operating when a hardware failure occurs. Fault tolerant data storage systems may store data across a plurality of disc drives and may include duplicate data, parity or other information that may be employed to reconstruct data if a drive fails.

The problems of mapping between logical and physical data addresses in virtualized storage systems have been recognized in the Prior Art and various systems have been developed to provide a solution, for example:

U.S. Pat. No. 5,392,244 (Jacobson et al.) discloses a method for managing data on a disk array, comprising the following steps: providing physical storage space on a disk array of plural disks; mapping the physical storage space into a first virtual storage space having first and second RAID areas, the first RAID area having first allocation blocks for holding data according to a first RAID level and the second RAID area having second allocation blocks for holding data according to a second RAID level; mapping the first virtual storage space into a second virtual storage space having multiple virtual blocks, the first and second virtual blocks being associated with the first and second allocation blocks in respective RAID areas via a virtual block table; selecting a first virtual block associated with a first allocation block in a first RAID area; locating a second allocation block in a second RAID area; transferring selected data from the first allocation block to the second allocation block so that the selected data once stored according to the first RAID level is now stored according to the second RAID level; and modifying the virtual block table to reflect the transfer data to the second RAID area.

U.S. Pat. No. 6,889,309 (Oliveira et al.) discloses a method and apparatus for managing a virtual data storage object in a computer system including at least one host and at least one storage device that present at least one storage disk to the host as a storage resource. The host includes at least one of an LVM and a file system. The virtual data storage object is created so that at least one of a logical volume and a file is employed as a storage resource to store data stored to the virtual data storage object. Another embodiment forms a virtual data storage object with data images stored on logical volumes from LVMs on different hosts. A further embodiment forms a virtual data storage object with one data image stored to a disk and another stored to a logical volume. Another embodiment is directed to a method and apparatus for distributing the metadata that defines a virtual storage object about the computer system.

U.S. Pat. No. 6,898,670 (Nahum) discloses a distributed architecture for the virtualization of storage capacity in a Storage Area Network (SAN) and for the management of virtual and physical memory. There is provided a virtualization software computer program consisting of two portions, namely virtualization and translation, each portion residing in a different location but both portions operating interactively. A SAN coupling an array of hosts via a Network Switch to an array of storage devices is equipped with a Storage Virtualization Manager. The SVM operating the virtualization computer software handles physical storage capacity virtualization and metadata management. The Network Switch routes storage I/O operations between the hosts and the storage devices, while the translation software resides in a processor, either in a host or elsewhere on the Network Switch SAN. Although the Network Switch and the SVM decouple tasks to relieve load and prevent bottlenecks, practical implementation permits to design the Network Switch, the processor(s) operating the virtualization program, and the SVM in many configurations spanning from distributed to integrated packaging. The virtualization software also supports real time configuration adaptation of changes occurring in the configuration of the array of hosts and of storage devices of the SAN.

U.S. Pat. No. 6,996,582 (Daniels et al.) discloses a virtual storage system and operational method thereof. The virtual storage system includes a physical storage space configured to store data, a virtual storage space adapted to provide a representation of data stored within the physical storage space to a host, a memory configured to store a plurality of pointers utilized to implement addressing intermediate the physical storage space and the virtual storage space, and a controller configured to extract selected ones of the pointers from the memory and to provide the selected pointers in another storage location different than the memory at a first moment in time and to extract the selected pointers from the another storage location and to provide the selected pointers in the memory at a second moment in time subsequent to the first moment in time.

U.S. Pat. No. 7,124,275 (Gammel et al.) discloses a method for determining a physical address from a virtual address, wherein a mapping regulation between the virtual address and the physical address is implemented as a hierarchical tree structure with compressed nodes. First, a compression indicator included in the mapping regulation is read, and a portion of the virtual address associated with the considered node level is read. Using the compression indicator and the portion of the virtual address, an entry in the node list of the considered node is determined. The determined entry is read, where-upon the physical address can be determined directly, if the considered node level has been the hierarchically lowest node level. If higher node levels to be processed are present, the previous steps in determining the physical address for compressed nodes of lower hierarchy level are repeated until the hierarchically lowest node level is reached.

U.S. Pat. No. 7,386,697 (Case et al.) discloses a virtual memory system, wherein address translation information is provided using a cluster that is associated with some range of virtual addresses and that can be used to translate any virtual address in its range to a physical address. The sizes of the ranges mapped by different clusters may be different. Clusters are stored in an address translation table that is indexed by a virtual address so that, starting from any valid virtual address, the appropriate cluster for translating that address can be retrieved from the translation table. The clusters are dynamically created from a fragmented pool of physical addresses as new virtual address mappings are requested by consumers of the virtual memory space.

US Patent Application No. 2007/101,083 (Ogihara et al.) discloses a virtual storage system control apparatus comprising a plurality of storage device control sections that assign virtual volumes to the storage devices of the virtual storage clusters, generate information on the virtual volumes, set up a link between the virtual volumes of the own virtual storage clusters and the virtual volumes of other virtual storage clusters by way of the network and copy data on the basis of the link and a management node that directs a move of a virtual volume by having the link set up according to the information on the virtual volumes.

SUMMARY OF THE INVENTION

In accordance with certain aspects of the subject matter of the present application, there is provided a storage system comprising a plurality of physical storage devices controlled by a plurality of storage control devices constituting a storage control layer, said layer operatively coupled to a plurality of hosts and to the plurality of physical storage devices constituting a physical storage space characterized by a plurality of disk block addresses (DBA). The storage control layer is operable to handle a logical address space characterized by a plurality of logical block addresses (LBAs) and divided into one or more logical groups and available to said plurality of hosts. The storage control layer further comprises an allocation module configured to provide mapping between one or more contiguous ranges of addresses related to the logical address space and one or more contiguous ranges of addresses related to the physical address space, said mapping provided with the help of one or more mapping trees, each tree assigned to a separate logical group in the logical address space. The logical group can be one or more logical volumes, one or more virtual partitions, one or more snapshots, combinations of a given logical volume and its respective one or more snapshots, etc.

In accordance with certain aspects of the subject matter of the present application there is provided a method of operating a storage system comprising a plurality of physical storage devices controlled by a plurality of storage control devices constituting a storage control layer, said layer operatively coupled to a plurality of hosts and to the plurality of physical storage devices constituting a physical storage space. The method comprises: a) representing to said plurality of hosts an available logical address space divided into one or more logical groups; and b) mapping between one or more contiguous ranges of addresses related to the logical address space and one or more contiguous ranges of addresses related to the physical address space, wherein said mapping is provided with the help of one or more mapping trees, each tree assigned to a separate logical group in the logical address space.

In all above aspects of the subject matter of the present application, the control layer can further comprise a first virtual layer operable to represent the logical address space, said first virtual layer characterized by a plurality of virtual unit addresses (VUA) and/or can further comprise a second virtual layer operable to represent the physical storage space, said second virtual layer characterized by a plurality of virtual disk addresses (VDA), and mapping between contiguous ranges of addresses related to the logical address space and contiguous ranges of addresses related to the physical address space can comprise at least one of the mapping options selected from a group comprising: a) mapping between LBA and DBA addresses; b) mapping between VUA and VDA addresses; c) mapping between LBA and VDA addresses; and d) mapping between VUA and DBA addresses.

The mapping tree can be configured as an ordered tree data structure comprising one or more leaves wherein a) a depth of a leaf in the tree represents a length of a contiguous range of addresses related to a given corresponding logical group; b) a given path followed from a tree root to the leaf indicates an offset of the respective range of addresses within the given logical group; c) a value associated with the leaf indicates an offset of respective contiguous range of addresses related to the physical storage space and corresponding to said contiguous range of addresses related to said given logical group.

The depth of a given leaf can be configured in inverse relation to the length of respective contiguous range of addresses related to respective logical group. A sequential number of a given leaf node can be calculated as D−1, wherein D is equal to a maximal admissible number of addresses related to the physical storage space divided by a number of contiguous addresses in the range of addresses related to the logical group.

The path followed from a tree root to the leaf can be represented as a string of zeros and ones depending on right and/or left branches comprised in the path. The offset of the respective range of addresses within the given logical group can be calculated in accordance with the path followed from the tree root to the leaf with the help of the following expression:

$$\sum_{i=0}^{d-1} r_i \cdot 2^{(M-i-1)}$$

where M is the power of two in the maximal number of admissible addresses in the given logical group, d is the depth of the leaf, i=0, 1, 2, 3, d−1 are the successive nodes in the tree leading to the leaf, and $r_i$ is a value equal to zero for one-side branching and equal to one for another side branching.

The mapping tree can comprise at least one leaf with at least two associated values, said associated values indicating offsets of two different contiguous ranges of addresses related to the physical storage space and corresponding to the same contiguous range of addresses related to the logical address space.

BRIEF DESCRIPTION OF THE DRAWINGS

In order to understand the invention and to see how it can be carried out in practice, embodiments will now be described, by way of non-limiting example only, with reference to the accompanying drawings, in which:

FIG. 5 illustrates a schematic diagram of IVAS and PVAS Allocation Tables in accordance with certain embodiments of the present invention;

FIGS. 7a-7d schematically illustrate other exemplary mapping of addresses related to logical volumes into addresses related to physical storage space in accordance with certain embodiments of the present invention;

FIG. 9a-9b schematically illustrate exemplary mapping a range of contiguous VUA addresses to more than one corresponding ranges of VDA addresses, in accordance with certain embodiments of the present invention; and FIG. 10a-10e schematically illustrate exemplary mapping a logical volume and corresponding generated snapshot(s) in accordance with certain embodiments of the present invention.

DETAILED DESCRIPTION OF EMBODIMENTS

Figure 1:
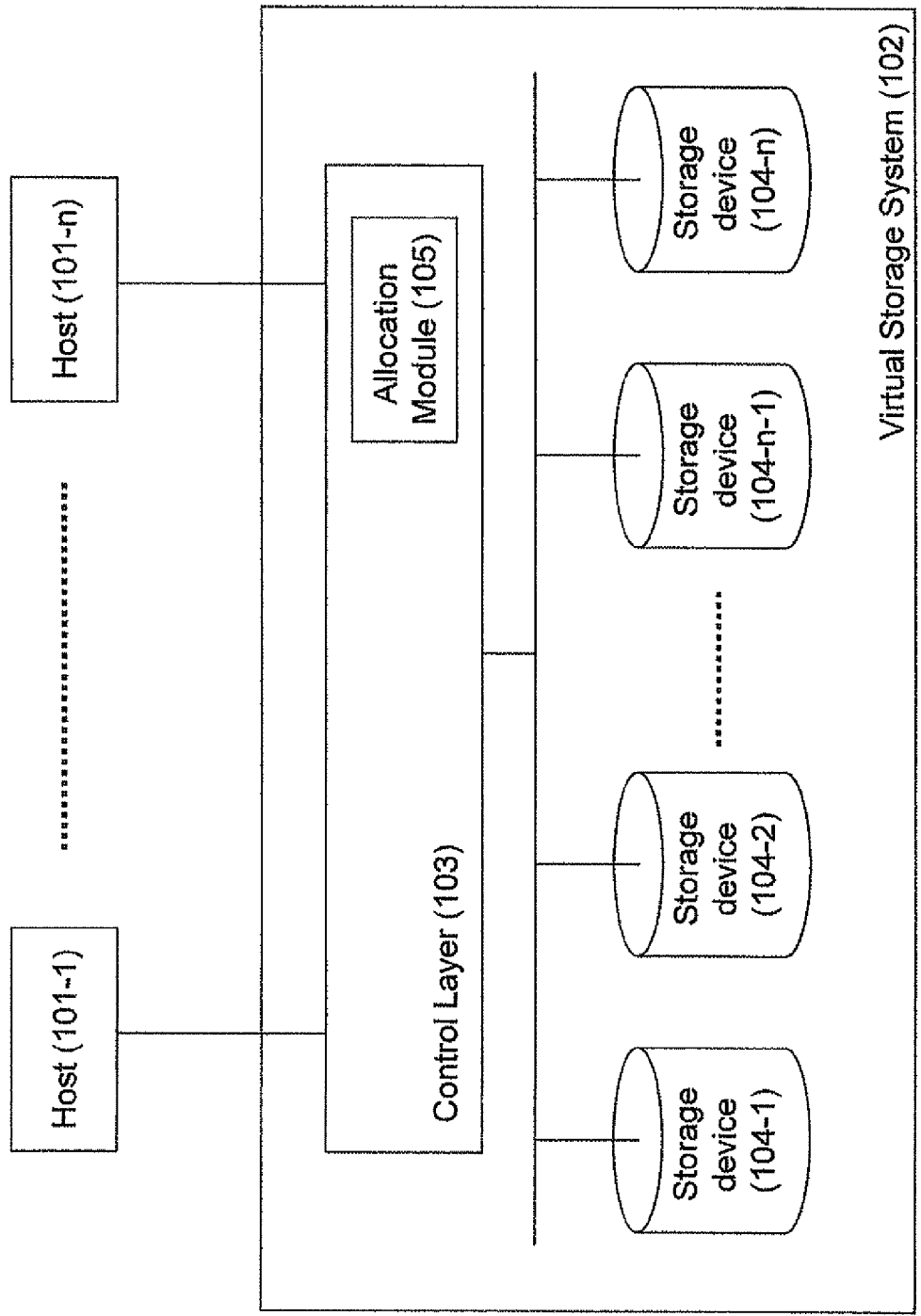
FIG. 1 illustrates a schematic functional block diagram of a computer system with virtualized storage system as known in the art.

In the following detailed description, numerous specific details are set forth in order to provide a thorough understanding of the invention. However, it will be understood by those skilled in the art that the present invention can be practiced without these specific details. In other instances, well-known methods, procedures, components and circuits have not been described in detail so as not to obscure the present invention. In the drawings and descriptions, identical reference numerals indicate those components that are common to different embodiments or configurations.

Unless specifically stated otherwise, as apparent from the following discussions, it is appreciated that throughout the specification discussions utilizing terms such as "processing", "computing", "calculating", "determining", "generating", "activating", "reading", "writing", "classifying", "allocating", "storing", "managing" or the like, refer to the action and/or processes of a computer that manipulate and/or transform data into other data, said data represented as physical, such as electronic, quantities and/or said data represent the physical objects. The term "computer" should be expansively construed to cover any kind of electronic system with data processing capabilities.

The operations in accordance with the teachings herein can be performed by a computer specially constructed for the desired purposes or by a general-purpose computer specially configured for the desired purpose by a computer program stored in a computer readable storage medium.

Embodiments of the present invention are not described with reference to any particular programming language. It will be appreciated that a variety of programming languages can be used to implement the teachings of the inventions as described herein.

The references cited in the background teach many principles of storage virtualization that are applicable to the present invention. Therefore the full contents of these publications are incorporated by reference herein for appropriate teachings of additional or alternative details, features and/or technical background.

Bearing this in mind, attention is drawn to FIG. 1 illustrating an exemplary virtualized storage system as known in the art.

The computer system comprises a plurality of host computers (workstations, application servers, etc.) illustrated as 101-1-101-n sharing common storage means provided by a virtualized storage system 102. The storage system comprises a storage control layer 103 comprising one or more appropriate storage control devices operatively coupled to the plurality of host computers and a plurality of data storage devices 104-1-104-n constituting a physical storage space optionally distributed over one or more storage nodes, wherein the storage control layer is operable to control interface operations (including I/O operations) therebetween. The storage control layer is further operable to handle a virtual representation of physical storage space and to facilitate necessary mapping between the physical storage space and its virtual representation. The virtualization functions can be provided in hardware, software, firmware or any suitable combination thereof. Optionally, the functions of the control layer can be fully or partly integrated with one or more host computers and/or storage devices and/or with one or more communication devices enabling communication between the hosts and the storage devices. Optionally, a format of logical representation provided by the control layer may differ, depending on interfacing applications.

The physical storage space can comprise any appropriate permanent storage medium and include, by way of non-limiting example, one or more disk drives and/or one or more disk units (DUs). The physical storage space comprises a plurality of data blocks, each data block can be characterized by a pair ($DD_{id}$, DBA), and where $DD_{id}$ is a serial number associated with the disk drive accommodating the data block, and DBA is a logical block number within the respective disk. By way of non-limiting example, $DD_{id}$ can represent a serial number internally assigned to the disk drive by the system or, alternatively, a WWN or universal serial number assigned to the disk drive by a vendor. The storage control layer and the storage devices can communicate with the host computers and within the storage system in accordance with any appropriate storage protocol.

Stored data can be logically represented to a client in terms of logical objects. Depending on storage protocol, the logical objects can be logical volumes, data files, multimedia files, snapshots and other copies, etc. For purpose of illustration only, the following description is provided with respect to logical objects represented by logical volumes. Those skilled in the art will readily appreciate that the teachings of the present invention are applicable in a similar manner to other logical objects.

A logical volume (LU) is a virtual entity logically presented to a client as a single virtual storage device. The logical volume represents a plurality of data blocks characterized by successive Logical Block Addresses (LBA) ranging from 0 to a number LUK. Different LUs can comprise different numbers of data blocks, while the data blocks are typically of equal size (e.g. 512 bytes). Blocks with successive LBAs can be grouped into portions that act as basic units for data handling and organization within the system. Thus, for instance, whenever space has to be allocated on a disk or on a memory component in order to store data, this allocation can be done in terms of data portions also referred to hereinafter as "allocation units". Data portions are typically of equal size throughout the system (by way of non-limiting example, the size of data portion can be 64 Kbytes).

The storage control layer can be further configured to facilitate various protection schemes. By way of non-limiting example, data storage formats, such as RAID (Redundant Array of Independent Discs), can be employed to protect data from internal component failures by making copies of data and rebuilding lost or damaged data. As the likelihood for two concurrent failures increases with the growth of disk array sizes and increasing disk densities, data protection can be implemented, by way of non-limiting example, with the RAID 6 data protection scheme well known in the art.

Common to all RAID 6 protection schemes is the use of two parity data portions per several data groups (e.g. using groups of four data portions plus two parity portions in (4+2) protection scheme), the two parities being typically calculated by two different methods. Under one known approach, all n consecutive data portions are gathered to form a RAID group, to which two parity portions are associated. The members of a group as well as their parity portions are typically stored in separate drives. Under a second known approach, protection groups can be arranged as two-dimensional arrays, typically n*n, such that data portions in a given line or column of the array are stored in separate disk drives. In addition, to every row and to every column of the array a parity data portion can be associated. These parity portions are stored in such a way that the parity portion associated with a given column or row in the array resides in a disk drive where no other data portion of the same column or row also resides. Under both approaches, whenever data is written to a data portion in a group, the parity portions are also updated (e.g. using approaches based on XOR or Reed-Solomon algorithms). Whenever a data portion in a group becomes unavailable (e.g. because of disk drive general malfunction, or because of a local problem affecting the portion alone, or because of other reasons), the data can still be recovered with the help of one parity portion via appropriate known in the art techniques. Then, if a second malfunction causes data unavailability in the same drive before the first problem was repaired, data can nevertheless be recovered using the second parity portion and appropriate known in the art techniques.

Successive data portions constituting a logical volume are typically stored in different disk drives (e.g. for purposes of both performance and data protection), and to the extent that it is possible, across different DUs. Typically, definition of LUs in the storage system involves in-advance configuring an allocation scheme and/or allocation function used to determine the location of the various data portions and their associated parity portions across the physical storage medium. Logical contiguity of successive portions and physical contiguity of the storage location allocated to the portions in the system are not necessarily correlated. The allocation scheme can be handled in an allocation module (105) being a part of the storage control layer. The allocation module can be implemented as a centralized module operatively connected to the plurality of storage control devices or can be, at least partly, distributed over a part or all storage control devices. The allocation module can be configured to provide mapping between logical and physical locations of data portions and/or groups thereof with the help of a mapping tree as further detailed with reference to FIGS. 6-10.

When receiving a write request from a host, the storage control layer defines a physical location(s) designated for writing the respective data (e.g. in accordance with an allocation scheme, preconfigured rules and policies stored in the allocation module or otherwise). When receiving a read request from the host, the storage control layer defines the physical location(s) of the desired data and further processes the request accordingly. Similarly, the storage control layer issues updates to a given data object to all storage nodes which physically store data related to the data object. The storage control layer is further operable to redirect the request/update to storage device(s) with appropriate storage location(s) irrespective of the specific storage control device receiving I/O request.

For purpose of illustration only, the operation of the storage system is described herein in terms of entire data portions. Those skilled in the art will readily appreciate that the teachings of the present invention are applicable in a similar manner to partial data portions.

Certain embodiments of the present invention are applicable to the architecture of a computer system described with reference to FIG. 1. However, the invention is not bound by the specific architecture, equivalent and/or modified functionality can be consolidated or divided in another manner and can be implemented in any appropriate combination of software, firmware and hardware. Those versed in the art will readily appreciate that the invention is, likewise, applicable to any computer system and any storage architecture implementing a virtualized storage system. In different embodiments of the invention the functional blocks and/or parts thereof can be placed in a single or in multiple geographical locations (including duplication for high-availability); operative connections between the blocks and/or within the blocks can be implemented directly (e.g. via a bus) or indirectly, including remote connection. The remote connection can be provided via Wire-line, Wireless, cable, Internet, Intranet, power, satellite or other networks and/or using any appropriate communication standard, system and/or protocol and variants or evolution thereof (as, by way of unlimited example, Ethernet, iSCSI, Fiber Channel, etc.). By way of non-limiting example, the invention can be implemented in a SAS grid storage system disclosed in U.S. patent application Ser. No. 12/544,743 filed on Aug. 20, 2009, assigned to the assignee of the present application and incorporated herein by reference in its entirety.

Figure 2:
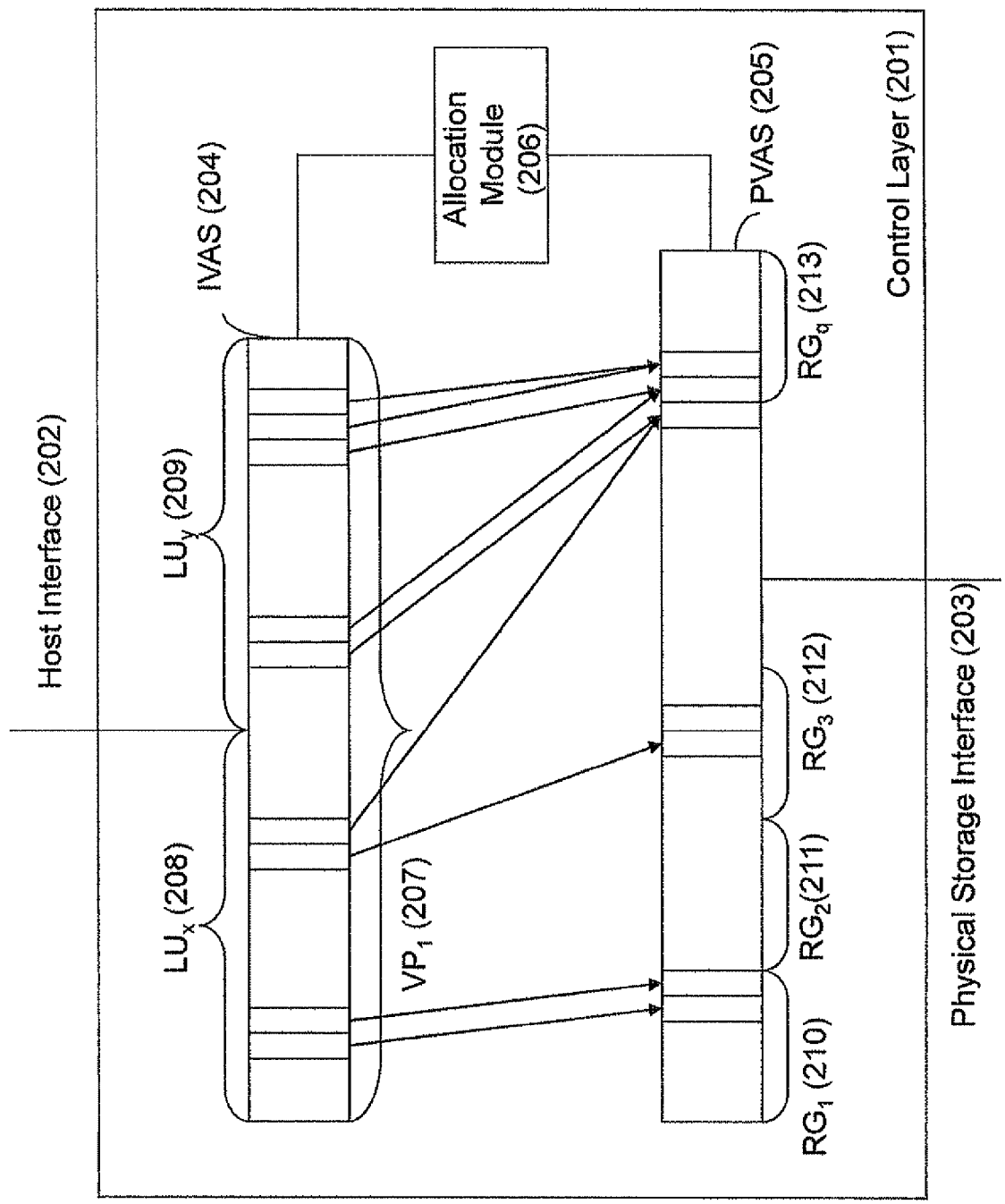
FIG. 2 illustrates a schematic functional block diagram of a control layer configured in accordance with certain embodiments of the present invention.

Referring to FIG. 2, there is schematically illustrated control layer 201 configured in accordance with certain embodiments of the present invention. The virtual presentation of entire physical storage space is provided through creation and management of at least two interconnected virtualization layers: a first virtual layer 204 interfacing via a host interface 202 with elements of the computer system (host computers, etc.) external to the storage system, and a second virtual layer 205 interfacing with the physical storage space via a physical storage interface 203. The first virtual layer 204 is operative to represent logical units available to clients (workstations, applications servers, etc.) and is characterized by an Internal Virtual Address Space (IVAS). The virtual data blocks are represented in IVAS with the help of virtual unit address (VUA). The second virtual layer 205 is operative to represent physical storage space available to the clients and is characterized by a Physical Virtual Address Space (PVAS). The virtual data blocks are represented in PVAS with the help of a virtual disk address (VDA). Addresses in IVAS are mapped into addresses in PVAS; while addresses in PVAS, in turn, are mapped into addresses in physical storage space for the stored data. The first virtual layer and the second virtual layer are interconnected, e.g. with the help of the allocation module 206 operative to provide translation from IVAS to PVAS via Internal-to-Physical Virtual Address Mapping. The allocation module 206 can be configured to provide mapping between VUAs and VDAs with the help of a mapping tree as further detailed with reference to FIGS. 6-10.

Each address in the Physical Virtual Address Space has at least one corresponding address in the Internal Virtual Address Space. Managing the Internal Virtual Address Space and Physical Virtual Address Space is provided independently. Such management can be provided with the help of an independently managed IVAS allocation table and a PVAS allocation table. The tables can be accommodated in the allocation module 206 or otherwise, and each table facilitates management of respective space in any appropriate way known in the art.

Among advantages of independent management of IVAS and PVAS is the ability of changing a client's side configuration of the storage system (e.g. new host connections, new snapshot generations, changes in status of exported volumes, etc.), with no changes in meta-data handled in the second virtual layer and/or physical storage space.

It should be noted that, typically in the virtualized storage system, the range of virtual addresses is substantially larger than the respective range of associated physical storage blocks. In accordance with certain embodiments of the present invention, the internal virtual address space (IVAS) characterizing the first virtual layer corresponds to a plurality of logical addresses available to clients in terms of LBAs of LUs. Respective LUs are mapped to IVAS via assignment of IVAS addresses (VUA) to the data portions constituting the LUs and currently available to the client.

By way of non-limiting example, FIG. 2 illustrates a part of the storage control layer corresponding to two LUs illustrated as LUx (208) and LUy (209). The LUs are mapped into the IVAS. In a typical case, initially the storage system assigns to a LU contiguous addresses (VUAs) in IVAS. However, existing LUs can be enlarged, reduced or deleted, and some new ones can be defined during the lifetime of the system. Accordingly, the range of contiguous data blocks associated with the LU can correspond to non-contiguous data blocks assigned in the IVAS.

As will be further detailed with reference to FIGS. 4 and 5, the parameters defining the request in terms of IVAS are further translated into parameters defining the request in the physical virtual address space (PVAS) characterizing the second virtual layer interconnected with the first virtual layer.

Responsive to configuring a logical volume (regular LU, thin volume, snapshot, etc.), the storage system allocates respective addresses in IVAS. For regular LUs the storage system further allocates corresponding addresses in PVAS, wherein allocation of physical addresses is provided responsive to a request to write the respective LU. Optionally, the PVAS allocation table can book the space required for LU and account it as unavailable, while actual address allocation in PVAS is provided responsive to respective write request.

As illustrated in FIG. 2, translation of a request in terms of IVAS into request in PVAS terms is not necessarily provided in a one-to-one relationship. In accordance with certain embodiments of the invention, several data blocks in the IVAS can correspond to one and the same data block in the PVAS, as for example in a case of snapshots and/or other copy mechanisms which can be implemented in the storage system. By way of non-limiting example, in the case of a snapshot, a source block and a target block in respective snapshot are presented to clients as having different addresses in the IVAS, but they share the same block in the PVAS until the source block (or the target block) is modified for the first time by a write request, at which point two different physical data blocks are produced.

By way of another non-limiting example, in a case of thin volume, each block of the LU is immediately translated into a block in the IVAS, but the association with a block in the PVAS is provided only when actual physical allocation occurs, i.e., only on the first write to corresponding physical block. In the case of thin volume the storage system does not provide booking of available space in PVAS. Thus, in contrast to a regular volume, thin volumes have no guaranteed available space in PVAS and physical storage space.

The Internal Virtual Address Space (IVAS) characterizing the first virtual layer 204 representing available logical storage space comprises virtual internal addresses (VUAs) ranging from 0 to $2^M$, where M is the number of bits used to express in binary terms the addresses in the IVAS (by way of non-limiting example, in further description we refer to M=56 corresponding to 64-bit address field). Typically, the range of virtual addresses in the IVAS needs to be significantly larger than the range of physical virtual addresses (VDAs) of the Physical Virtual Address Space (PVAS), characterizing the second virtual layer 205 representing available physical storage space.

Usually, in mass storage systems a certain part of the overall physical storage space is defined as not available to a client, so it can be used as a spare space in case of necessity or for other purposes. Accordingly, the entire range of physical virtual addresses (VDAs) in PVAS can correspond to a certain portion (e.g. 70-80%) of the total physical storage space available on the disk drives. By way of non-limiting example, if a system with raw physical capacity of 160 TB with 30% of this space allocated for spare purposes is considered, then the net capacity will be 113 TB. Therefore, the highest possible address VDA that can be assigned in the PVAS of such a system is about $2^{42}$ ($2^{42} \sim 113*10^{12}$), which is substantially less than the entire range of $2^{56}$ addresses VUA in the IVAS.

As will be further detailed with reference to FIGS. 4-5, at any given point in time, there can be several data blocks in the IVAS corresponding to one data block in the PVAS. Moreover, a significant amount of data blocks in the IVAS can be initially provided to a client without associating with any block in the PVAS, with later association with PVAS only upon actual physical allocation, if at all.

The storage control layer can be further virtualized with the help of one or more virtual partitions (VPs).

By way of non-limiting example, FIG. 2 illustrates only a part of the storage control layer corresponding to a virtual partition $VP_1$ (207) selected among the plurality of VPs corresponding to the control layer. The $VP_1$ (207) comprises several LUs illustrated as LUx (208) and LUy (209). The LUs are mapped into the IVAS. The storage control layer translates a received request (LUN, LBA, block_count) into requests (VPid, VUA, block_count) defined in the IVAS. In a typical case, initially the storage system assigns to a LU contiguous addresses (VUAs) in the IVAS. However, existing LUs can be enlarged, reduced or deleted, and some new ones can be defined during the lifetime of the system. Accordingly, the range of contiguous data blocks associated with the LU can correspond to non-contiguous data blocks assigned in the IVAS: (VPid, VUA1, block_count1), (VPid, VUA2, block_count2), etc. Unless specifically stated otherwise, referring to hereinafter the parameter (VPid, VUA, block_count) can also include referring to the two or more parameters (VPid, $VUA_i$, block_$count_i$).

In accordance with certain embodiments of the present invention, the parameters (VPid, VUA, block_count) that define the request in IVAS are further translated into (VPid, VDA, block_count) defining the request in the physical virtual address space (PVAS) characterizing the second virtual layer interconnected with the first virtual layer.

For purpose of illustration only, the following description is made with respect to RAID 6 architecture. Those skilled in the art will readily appreciate that the teachings of the present invention are not bound by RAID 6 and are applicable in a similar manner to other RAID technology in a variety of implementations and form factors.

Figure 3:
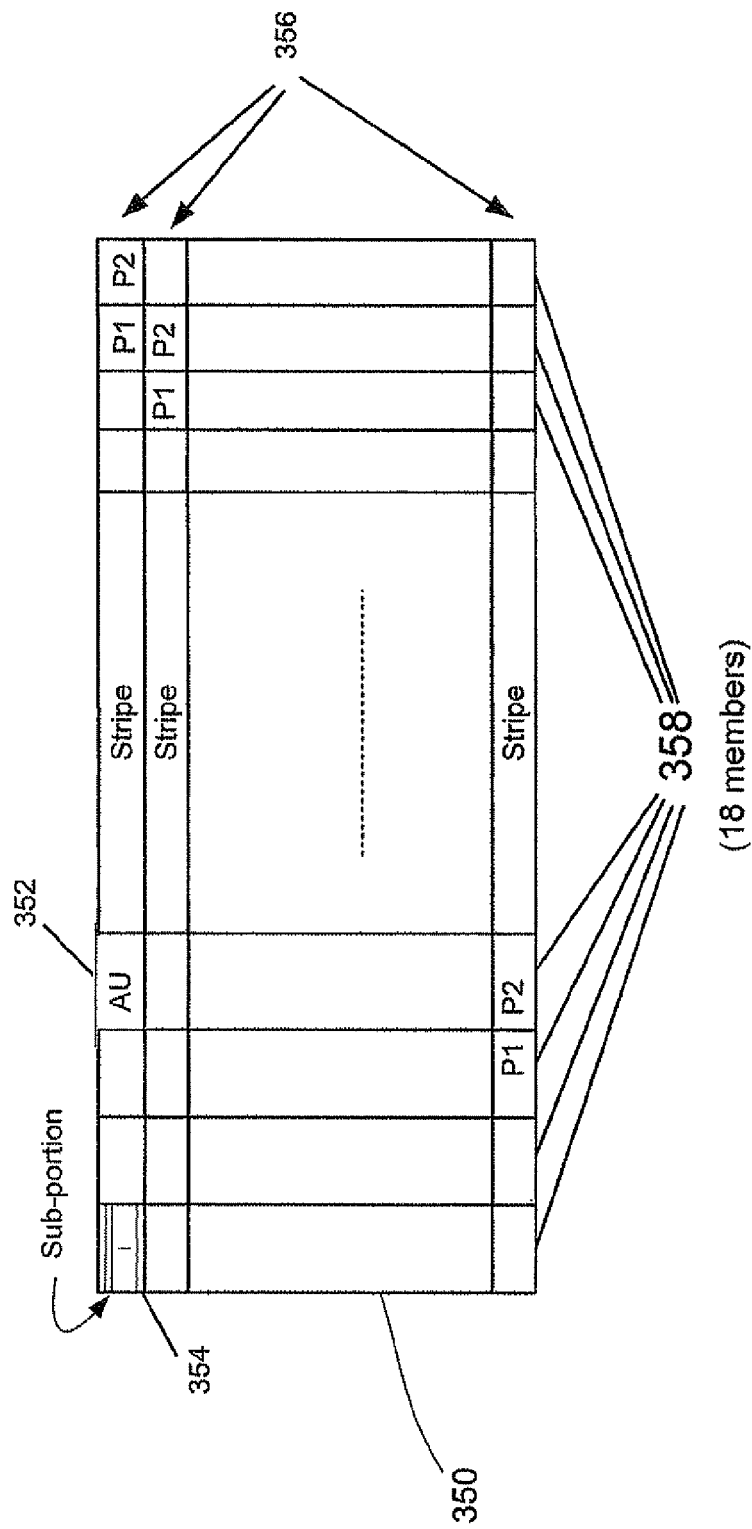
FIG. 3 illustrates a schematic diagram of physical storage space configured in RAID group as known in the art.

The physical storage space can be configured as RAID groups concatenation as further illustrated in FIG. 3. Accordingly, as illustrated in FIG. 2, the second virtual layer 205 representing the physical storage space can be also configured as a concatenation of RAID Groups (RGs) illustrated as $RG_1$ (210) to RGq (213). Each RAID group comprises a set of contiguous data blocks, and the address of each such block can be identified as (RGid, RBA), by reference to the RAID group RGid and a RAID logical block number RBA within the group.

Referring to FIG. 3, there is illustrated a schematic diagram of physical storage space configured in RAID groups as known in the art. A RAID group (350) can be built as a concatenation of stripes (356), the stripe being a complete (connected) set of data and parity elements that are dependently related by parity computation relations. In other words, the stripe is the unit within which the RAID write and recovery algorithms are performed in the system. A stripe comprises N+2 data portions (352), the data portions being the intersection of a stripe with a member (356) of the RAID group. A typical size of the data portions is 64 KByte (or 128 blocks). Each data portion is further sub-divided into 16 sub-portions (354) each of 4 Kbyte (or 8 blocks). Data portions and sub-portions are used to calculate the two parity data portions associated with each stripe. In an example, with N=16, and with a typical size of 4 GB for each group member, the RAID group can typically comprise (4*16=) 64 GB of data. A typical size of the RAID group, including the parity blocks, can be of (4*18=) 72 GB.

Each RG comprises n+2 members, MEMi (0≤i≤n+1), with n being the number of data portions per RG (e.g. n=16). The storage system is configured to allocate data associated with the RAID groups over various physical drives. The physical drives need not be identical. For purposes of allocation, each PD can be divided into successive logical drives (LDs). The allocation scheme can be accommodated in the allocation module.

Figure 4:
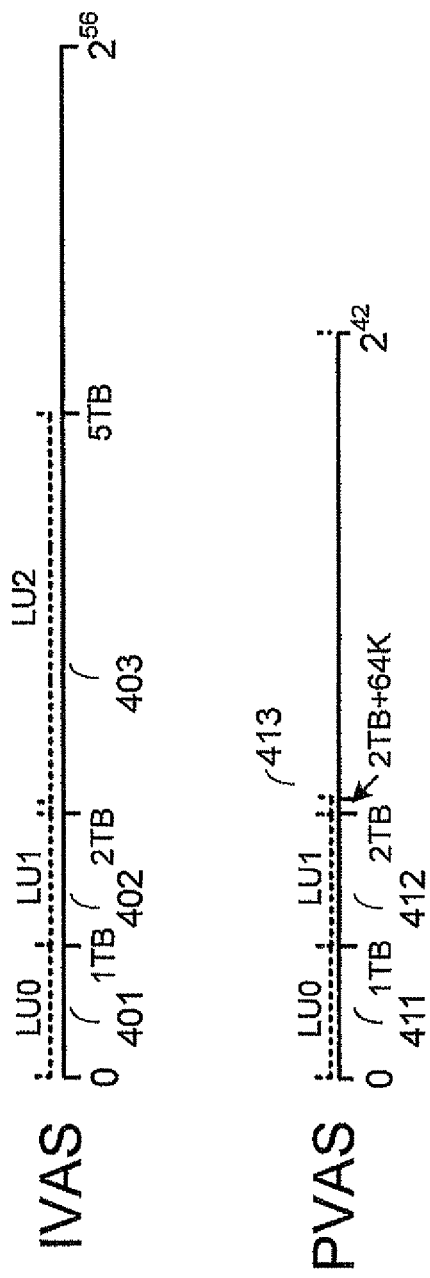
FIG. 4 illustrates a schematic diagram of representing exemplified logical volumes in the virtual layers in accordance with certain embodiments of the present invention.

Referring to FIG. 4, there is schematically illustrated translation from IVAS to PVAS in accordance with certain embodiments of the present invention.

As has been detailed with reference to FIG. 2, IO requests are handled at the level of the PVAS in terms of (VPid, VDA, block_count). As PVAS represents concatenation of RGs, such requests can be further translated in terms of the relevant RAID groups as (RGid, RBA, block_count) and from there in terms of physical address on the disks, as (DDid, DBA, block_count), assigned to the RAID groups in accordance with an allocation scheme. However, the translation is provided still at the PVAS level, wherein the actual allocation of physical storage space for a certain RAID group is provided responsive to an arriving first write request directed to this group. A Utilization Bitmap of the physical storage space indicates which RAID groups have already been allocated.

It should also be noted that certain additional data protection mechanisms (as, for example, "Data Integrity Field" (DIF) or similar ones) handled only at a host and at the RAID group, can be passed transparently over the virtualization layers.

The schematic diagram in FIG. 4 illustrates representing exemplified logical volumes in the virtual layers in accordance with certain embodiments of the present invention. In the illustrated case the user has defined two logical volumes LU0, LU1, each of 1 TB size, and logical volume LU2 of 3 TB size. The logical volumes have been respectively mapped in IVAS as ranges 401, 402 and 403. The IVAS allocation table (illustrated in FIG. 5) is updated accordingly.

Logical Volumes LU0 and LU1 have been configured as regular volumes, while the logical volume LU2 has been configured as a thin logical device (or dynamically allocated logical device). Accordingly, ranges 401 and 402 in IVAS have been provided with respective allocated 1 TB ranges 411 and 412 in PVAS, while no allocation has been provided in PVAS with respect to the range 403. As will be further detailed in connection with Request 3, allocation 413 in PVAS for LU2 will be provided responsive to respective write requests. PVAS allocation table (illustrated in FIG. 5) is updated accordingly upon allocation of ranges 411 and 412, and upon respective writes corresponding to LU2.

FIG. 5 schematically illustrates IVAS and PVAS Allocation Tables for exemplified logical volumes. Further to the example illustrated in FIG. 4, in the case illustrated in FIG. 5 the user has defined logical volume LU3 of 0.5 TB size and then has generated a snapshot of LU3, here defined as logical volume LU4 (with the same size). Accordingly, IVAS allocation table illustrates allocations of respective ranges 401-405 in IVAS. Ranges 401 and 402 have corresponding ranges 411 and 412 allocated in the PVAS allocation table. Ranges 404 and 405 in IVAS correspond to a common range 414 allocated in PVAS. The source volume LU3 and the target volume LU4 of the respective snapshot are presented to clients as having different addresses in the IVAS (404 and 405 respectively), but they share the same addresses (414) in the PVAS until the source or the target is modified for the first time by a write request, at which point a respective new range will be allocated in PVAS. Allocation 413 for LU2 is provided in the PVAS allocation table upon receiving respective write request (in the illustrated case after allocation of 414). Responsive to further write requests, further allocations for LU2 can be provided at respectively available addresses with no need of in-advance reservations in PVAS.

Hence, the total space allocated for volumes LU0-LU4 in IVAS is 6 TB, and respective space allocated in PVAS is 2.5 TB+64 KB.

Table 1 illustrates non-limiting examples of JO requests to the above exemplified logical volumes in terms of host and the virtualization layers. For simplicity the requests are described without indicating VPs to which they can be directed.

TABLE 1

|  | Host layer | 1st virtualization layer (IVAS) | 2nd virtualization layer (PVAS) |
| --- | --- | --- | --- |
| Request 1 | (LU0, 200 GB, 100 GB) | (0 + 200 GB, 100 GB) | (0 + 200 GB, 100 GB) |
| Request 2 | (LU1, 200 GB, 100 GB) | (1 TB + 200 GB, 100 GB) | (1 TB + 200 GB, 100 GB) |
| Request 3 | (LU2, 0, 64 KB) | (2 TB + 0, 64 KB) | (2.5 TB + 0, 64 KB) |
| Request 4 | (LU3, 50 GB, 100 GB) | (5 TB + 50 GB, 100 GB) | (2 TB + 50 GB, 100 GB) |
| Request 5 | (LU4, 10 GB, 50 GB) | (5.5 TB + 10 GB, 50 GB) | (2 TB + 10 GB, 50 GB) |

Request 1 is issued by a host as a request to LU0. Its initial offset within the LU0 is 200 GB, and its length is 100 GB.

Since LU0 starts in the IVAS at offset 0, the request is translated in IVAS terms as a request to offset 0+200 GB, with length 100 GB. With the help of Internal-to-Physical Virtual Address Mapping the request is translated in terms of PVAS as a request starting at offset 0+200 (0 being the offset representing in the PVAS offset 0 of the IVAS), and with length 100 GB.

Similarly, Request 2 is issued by a host as a request to LU1. Its initial offset within the LU1 is 200 GB, and its length is 100 GB. Since LU1 starts in the IVAS at offset 1 TB, the request is translated in IVAS terms as a request to offset 1 TB+200 GB, with length 100 GB. With the help of Internal-to-Physical Virtual Address Mapping this request is translated in terms of PVAS as a request starting at 1 TB+200 GB (1 TB being the offset representing in the PVAS offset 1 TB of the IVAS), and with length 100 GB.

Request 3 is issued by a host as a first writing request to LU2 to write 64K of data at offset 0. As LU2 is configured as a thin volume, it is represented in IVAS by the address range 2 TB-5 TB, but has no pre-allocation in PVAS. Since LU2 starts in the IVAS at offset 2 TB, the request is translated in IVAS terms as a request to offset 2 TB+0, with length 64 KB. As there were no pre-allocations to LU2 in PVAS, the allocation module checks available PVAS address in PVAS allocation table (2.5 TB in the illustrated case) and translates the request in terms of PVAS as a request starting at 0+2.5 TB and with length 64 KB.

Request 4 is issued by a host as a read request to LU3 (source volume) to read 100 GB of data at offset 50 G. Since LU3 starts in the IVAS at offset 5 TB, the request is translated in IVAS terms as a request to offset 5 TB+50 GB, with length 100 GB. With the help of Internal-to-Physical Virtual Address Mapping this request is translated in terms of PVAS as a request starting at 2 TB+50 GB (2 TB being the offset representing in the PVAS offset 2 TB of the IVAS), and with length 100 GB.

Request 5 is issued by a host as a read request to LU4 (target volume) to read 50 GB of data at offset 10 G. Since LU4 starts in the IVAS at offset 5.5 TB, the request is translated in IVAS terms as a request to offset 5.5 TB+10 GB, with length 50 GB. With the help of Internal-to-Physical Virtual Address Mapping this request is translated in terms of PVAS as a request starting at 2 TB+10 GB (2 TB being the offset representing in the PVAS offset 2 TB of the IVAS), and with length 50 GB.

It should be noted that Request 4 and Request 5 directed to a source and a target (snapshot) volumes correspond to different ranges (404 and 405) in IVAS, but to the same range in PVAS (until LU3 or LU4 are first modified and are provided by a correspondent allocation in PVAS).

It should be also noted that, as illustrated, the requests handled at IVAS and PVAS levels do not comprise any reference to logical volumes requested by hosts. Accordingly, the control layer configured in accordance with certain embodiments of the present invention enables to handle, in a uniform manner, various logical objects (LUs, files, etc.) requested by hosts, thus facilitating simultaneous support of various storage protocols. The first virtual layer interfacing with clients is configured to provide necessary translation of IO requests, while the second virtual layer and the physical storage space are configured to operate in a protocol-independent manner. Accordingly, in a case of further virtualization with the help of virtual partitions, each virtual partition can be adapted to operate in accordance with its own protocol (e.g. SAN, NAS, OAS, CAS, etc.) independently from protocols used by other partitions.

The control layer configured in accordance with certain embodiments of the present invention further facilitates independent configuring protection of each virtual partition. Protection for each virtual machine can be configured independently from other partitions in accordance with individual protection schemes (e.g. RAID1, RAID5, RAID6, etc.) The protection scheme of certain VP can be changed with no need in changes at the client's side configuration of the storage system.

By way of non-limiting example, the control layer can be divided into six virtual partitions so that VP0 and VP3 use RAID1, VP1 and VP4 use RAID 5, and VP2 and VP6 use RAID 6 protection schemes. All RGs of the certain VP are handled according to the stipulated protection level. When configuring a LU, a user is allowed to select a protection scheme to be used, and to assign the LU to a VP that provides that level of protection. The distribution of system resources (e.g. physical storage space) between the virtual partitions can be predefined (e.g. equally for each VP). Alternatively, the storage system can be configured to account the disk space already assigned for use by the allocated RGs and, responsive to configuring a new LU, to check if available resources for accepting the volume exist, in accordance with the required protection scheme. If the available resources are insufficient for the required protection scheme, the system can provide a respective alert. Thus, certain embodiments of the present invention enable dynamic allocation of resources required for protecting different VPs.

Referring back to FIG. 5, the IVAS and PVAS Allocation Tables can be handled as independent linked lists of used ranges. The tables can be used for deleting LUs and de-allocating the respective space. For example, deleting LU1 requires indicating in the IVAS Allocation Table that ranges 0-1 TB and 2-6 TB are allocated, and the rest is free, and at the same time indicating in the PVAS Allocation Table that ranges 0-1 TB and 2-2.5 TB+64 KB are allocated, and the rest is free. Deleting LU3, requires indicating in the IVAS Allocation Table that ranges 0-5 TB and 5.5-6 TB are allocated, and the rest is free, while the PVAS Allocation Table will remain unchanged.

In certain embodiments of the present invention, deleting a logical volume can be done by combining two separate processes: an atomic process (that performs changes in the IVAS and its allocation table) and a background process (that performs changes in the PVAS and its allocation table). Atomic deletion process is a "zero-time" process enabling deleting the range allocated to the LU in the IVAS Allocation Table. The LU number can remain in the table but there is no range of addresses associated with it. This means that the volume is not active, and an IO request addressed at it cannot be processed. The respective range of IVAS addresses is de-allocated and it is readily available for new allocations. Background deletion process is a process which can be performed gradually in the background in accordance with preference levels determined by the storage system in consideration of various parameters. The process scans the PVAS in order to de-allocate all ranges corresponding to the ranges deleted in the IVAS Allocation Table during the corresponding atomic process, while updating Utilization Bitmap of the physical storage space if necessary. Likewise, during this background process, the Internal-to-Physical Virtual Address Mapping is updated, so as to eliminate all references to the IVAS and PVAS just de-allocated.

If an LU comprises more than one range of contiguous addresses in IVAS, the above combination of processes is provided for each range of contiguous addresses in IVAS.

As was illustrated with reference to FIG. 5, the IVAS-based step of deleting process can be provided without the PVAS-based step. For example, a non-allocated at physical level snapshot or thin volume can be deleted from IVAS, with no need in any changes in PVAS and/or physical storage space, as there were no respective allocations.

In accordance with certain embodiments of the invention, there is further provided a functionality of "virtual deleting" of a logical volume defined in the system. When a user issues a "virtual deleting" for a given LU in the system, the system can perform the atomic phase of the deletion process (as described above) for that LU, so that the LU is de-allocated from the IVAS and is made unavailable to clients. However, the background deletion process is delayed, so that the allocations in IVAS and PVAS (and, accordingly, physical space) and the Internal-to-Physical Virtual Address Mapping are kept temporarily unchanged. Accordingly, as long as the background process is not effective, the user can instantly un-delete the virtually deleted LU, by just re-configuring the respective LU in IVAS as "undeleted". Likewise, the "virtual deleting" can be implemented for snapshots and other logical objects.

The metadata characterizing the allocations in IVAS and PVAS can be kept in the system in accordance with pre-defined policies. Thus, for instance, the system can be adapted to perform the background deletion process (as described above) 24 hours after the atomic phase was completed for the LU. In certain embodiments of the invention the period of time established for initiating the background deletion process can be adapted to different types of clients (e.g. longer times for VIP users, longer types for VIP applications, etc.). Likewise, the period can be dynamically adapted for individual volumes or be system-wide, according to availability of resources in the storage system, etc.

As will be further detailed with reference to FIGS. 6-10, mapping between addresses related to logical address space and addresses related to physical storage space may be provided with the help of a mapping tree(s) configured in accordance with certain embodiments of the present invention. The mapping trees may be handled by the allocation module. The mapping trees are further associated with an allocation table indicating allocated and free addresses in the physical storage space. A combination of the allocation table and the mapping tree can be also further used for Deleting a Volume in the storage system.

For purpose of illustration only, in the following description each logical volume is associated with a dedicated mapping tree. Those skilled in the art will readily appreciate that the teachings of the present invention are applicable in a similar manner to a mapping tree associated with a group of logical volumes (e.g. one mapping tree for entire virtual partition, for a combination of a logical volume and its respective snapshot(s), etc.). For convenience, addresses in the IVAS may be assigned separately for each volume and/or volumes group.

Referring to FIGS. 6-10, there are schematically illustrated examples of mapping trees (and associated allocation tables) representing examples of function allocating addresses related to physical storage space (e.g. DBA, VDA) to addresses related to a given logical volume (e.g. LBA, VUA), such function being referred to hereinafter as an "allocation function".

In accordance with certain embodiments of the present invention, the mapping tree (referred to hereinafter also as "tree") has a trie configuration, i.e. is configured as an ordered tree data structure that is used to store an associative array, wherein a position of the node in the trie indicates certain values associated with the node. There are three types of nodes in the mapping tree: a) having no associated values, b) associated with a pointer to a further node, or c) associated with numerical values, such nodes representing the leaves of the tree. In accordance with certain embodiments of the present invention, a leaf in the mapping tree indicates the following:

The depth of the leaf in the tree represents the length of a contiguous range of addresses related to the logical volume that is mapped by the tree: the deeper the leaf, the shorter the range it represents (and vice versa: the closer the leaf to the root, the longer the contiguous range it represents). The sequential number of a leaf node k can be calculated as k=((maximal admissible number of addresses related to the physical storage space)/(number of contiguous addresses in the range of addresses related to the logical volume))−1.

A given path followed from root to the leaf indicates an offset of the respective range of addresses within the given logical volume. Depending on right and/or left branches comprised in the path, the path is represented as a string of 0s and 1s, with 0 for a one-side (e.g. left) branches and 1 for another-side (e.g. right) branches.

The value associated with the leaf indicates an offset of respective contiguous range of addresses related to the physical storage space and corresponding to the contiguous range of addresses within the given volume.

Updating the mapping trees is provided responsive to pre-defined events (e.g. receiving a write request, allocation of VDA address, destaging respective data from a cache, physical writing the data to the disk, etc.).

The mapping tree can be linearized when necessary. Accordingly, the tree can be saved in a linearized form in the disks or transmitted to a remote system thus enabling its availability for recovery purposes.

For purpose of illustration only, the following description is provided in terms of a binary trie. Those skilled in the art will readily appreciate that the teachings of the present invention are applicable in a similar manner to Nary trie, where N is a number of elements in a RAID group. For example, for RAID6 application with 16 RAID group, the tree can be configured as 16-ary trie with a bottom layer comprising 14 branches corresponding to 14 data portions.

For purpose of illustration only, the following description is provided with respect to the mapping tree operable to provide Internal-to-Physical Virtual Address Mapping, i.e. between VUA and VDA addresses. Those skilled in the art will readily appreciate that, unless specifically stated otherwise, the teachings of the present invention are applicable in a similar manner to direct mapping between logical and physical locations of data portions and/or groups thereof, i.e. between LBA and DBA addresses, for mapping between LBA and VDA, between VUA and DBA, etc.

The maximal admissible number of VUAs in a logical volume is assumed as equal to $14*16^{15}-1$, while the maximal admissible VDA in the entire storage system is assumed as equal to $2^{42}-1$. Further, for simplicity, the range of VUAs in a given logical volume is assumed as $0-2^{48}$, and the range of VDAs in the entire storage system is assumed as $0-2^{32}$. Those skilled in the art will readily appreciate that these ranges are used for illustration purposes only.

Allocation function VDA_allot (VUA_address, range_length)=<(VDA_address, range_length) maps a range of contiguous VUAs to a range of contiguous VDAs.

Figure 6A:
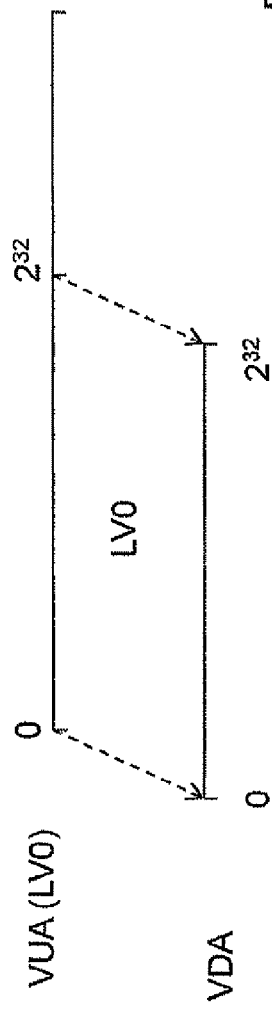
FIGS. 6a-6c schematically illustrate an exemplary mapping of addresses related to logical volumes into addresses related to physical storage space in accordance with certain embodiments of the present invention.

By way of simplified non-limiting example, FIG. 6*a* schematically illustrates mapping of entire range of contiguous addresses (VUA) corresponding to a volume LV0 to addresses (VDA) corresponding to the physical address space. VUA range starts at offset 0 and has a length of $2^{32}$ allocation units, VDU range also starts at offset 0 and has a length of $2^{32}$ allocation units. The mapping tree (degenerated in this case) representing corresponding allocation function VDA_Alloc$_{LV0}$ (0, $2^{32}$)=(0, $2^{32}$) is illustrated in FIG. 6b; the tree comprises a single node and a root, which is also a leaf with associated value equal to 0. The leaf in the illustrated tree indicates the following:
- the depth of the leaf is a single node, and hence it represents the entire range of length ($2^{32}$);
- the specific path followed from root to leaf is empty and hence it indicates that the initial VUA-offset is 0;
- the value associated with the leaf is 0, and hence the initial VDA-offset of the range is 0.

Figure 6C:
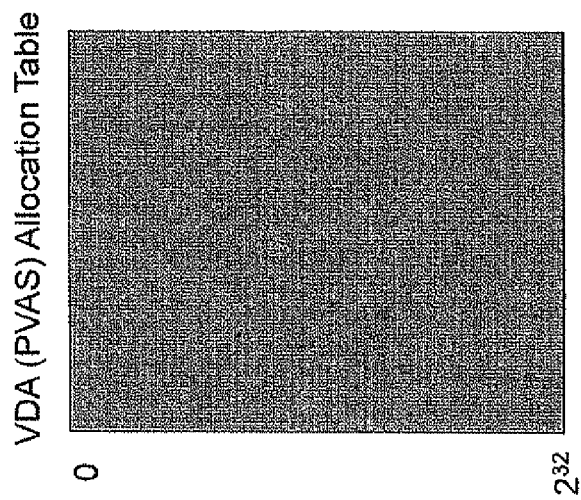
Figure 6B:
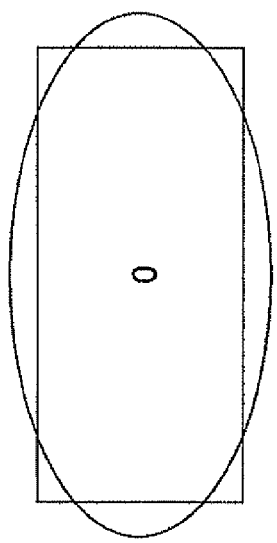

The mapping tree illustrated in FIG. 6b is associated with the corresponding VDA Allocation Table illustrated in FIG. 6c. In the illustrated example the entire range of VDA addresses has been allocated, and there is no room for further allocations.

Figure 7A:
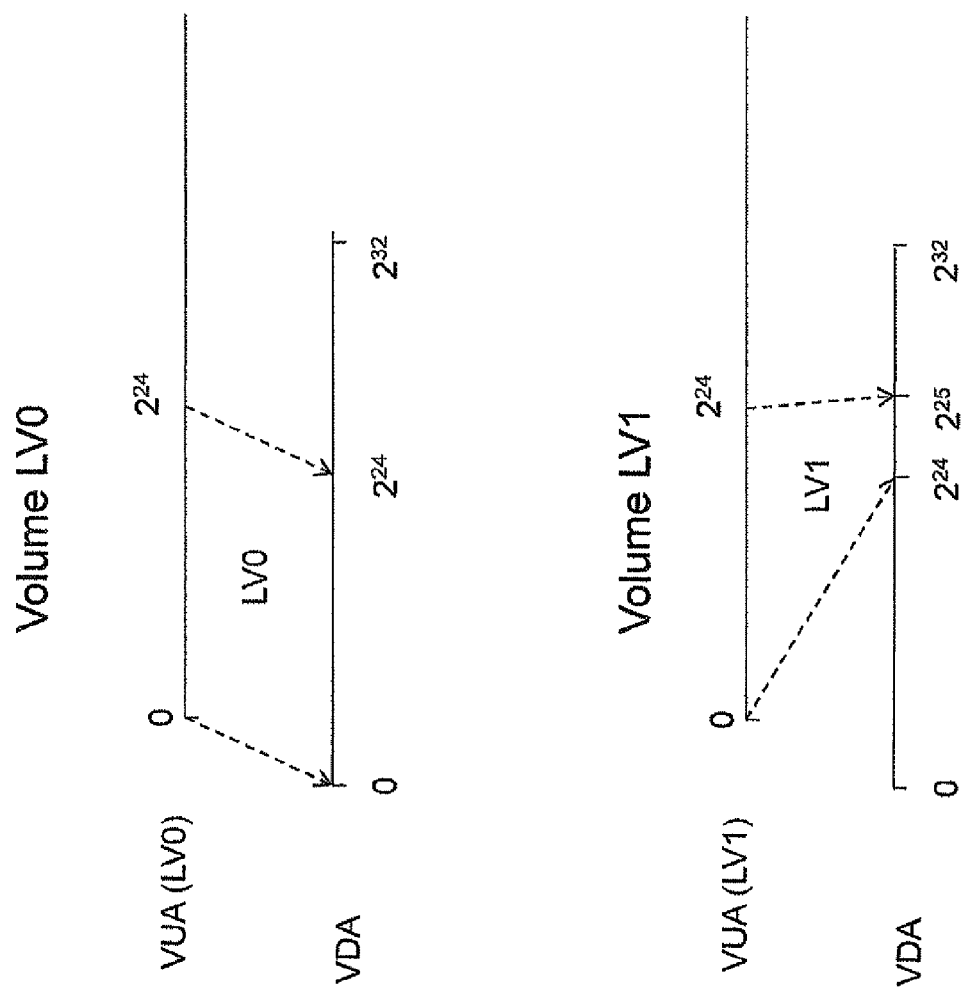

Referring now to FIG. 7a, there is schematically illustrated other non-limiting example of mapping a range of addresses corresponding to volumes LV0 and LV1, each at offset 0 in the respective volume, has size 1 TB (i.e. $2^{24}$ allocation units), and represented by a string of contiguous VUA addresses to be mapped into corresponding contiguous ranges of VDAs. It is assumed for illustration purposes that the VDA range for volume LV1 is allocated after allocation provided for volume LV1, and that PVAS was entirely free before starting the allocation process.

The allocation function for volume LV0 is VDA_Alloc$_{LV0}$ (0, $2^{24}$)=(0, $2^{24}$) and is presented by the mapping tree illustrated in FIG. 7b. The allocation function for volume LV1 is VDA_Alloc$_{LV1}$ (0, $2^{24}$)=($2^{24}$, $2^{24}$) and is presented by the mapping tree illustrated in FIG. 7c. The mapping trees are associated with the VDA Allocation Table illustrated in FIG. 7d.

The illustrated trees indicate the following:
- The depth of the leaves in both trees is $2^8-1$. Since the maximal admissible number of addresses related to the physical storage space is assumed as $2^{32}$, each leaf represents a range of contiguous VUAs equal to $2^{32-8}=2^{24}$.
- The paths from root to leaf in both trees are "all left branches", and hence correspond to a string of k=$2^8$ zeros. As will be further detailed with reference to FIG. 8c, such a string is interpreted as an indication that the represented VUA-offsets is 0.
- The value associated with the leaf in the tree of LU0 is 0, and hence the initial VDA-offset is 0. The value associated with the leaf in the tree of LU1 is $2^{24}$, and hence the initial VDA-offset of the range is $2^{24}$.

Accordingly, in both illustrated trees, position of the leaves, respective path from the root to the leaves and value associated with the leaves correspond to illustrated respective allocation functions.

Figure 8A:
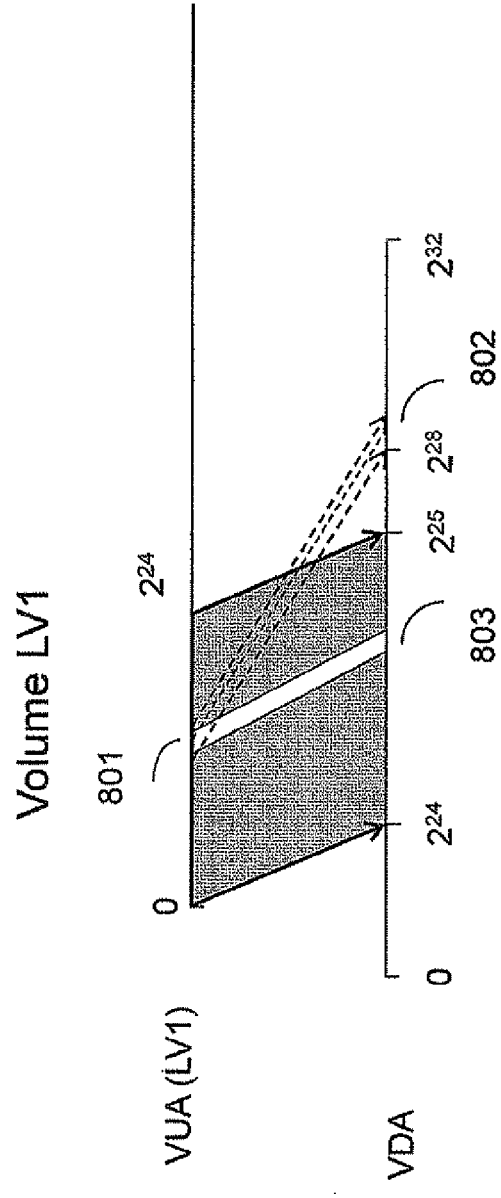
FIGS. 8a-8c schematically illustrate exemplary mapping, in accordance with certain embodiments of the present invention, a range of previously allocated addresses related to logical volumes responsive to modification by a write request.

Referring now to FIG. 8a, there is schematically illustrated a non-limiting example of mapping a range of previously allocated addresses responsive to modification by a write request. A VUA range 801 of length 1 GB (i.e., $2^{30}$ bytes or $2^{14}$ allocation units) is located at offset $2^{10}$ within LV1 detailed with reference to FIGS. 7a-7d. Upon modification, the range 801 has been provided with the corresponding range 802 of allocated VDA addresses, starting at VDA-offset $2^{28}$, and previously allocated to this VUAs range of addresses 803 has become non-allocated (and may be further freed by defragmentation/garbage collection processes).

Upon modification, previously contiguous range of VUAs is constituted by 3 sub-ranges: 1) contiguous range with VUA-offset 0 and length $2^{10}$, 2) modified contiguous range with VUA-offset $2^{10}$ and length $2^{14}$, and 3) contiguous range with VUA-offset $0+2^{10}+2^{10}$ and $2^{24}-2^{10}-2^{14}$.

The allocation function for $1^{st}$ sub-range is VDA_Alloc$_{LV1}$ (0, $2^{10}$)=($2^{24}$, $2^{10}$).

The allocation function for the $2^{nd}$ (modified) sub-range is VDA_Alloc$_{LV1}$ ($0+2^{10}$, $2^{14}$)=($2^{28}$, $2^{14}$).

The allocation function for the $3^{rd}$ sub-range is VDA_Alloc$_{LV1}$ ($0+2^{10}+2^{14}, 2^{24}-2^{10}-2^{14}$)=($2^{24}+2^{10}+2^{14}, 2^{24}-2^{10}-2^{14}$).

Figure 8B:
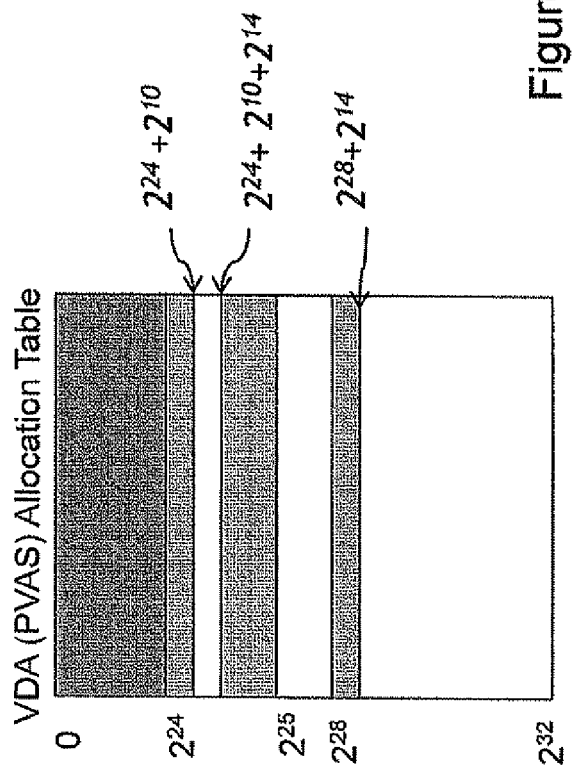
Figure 8C:
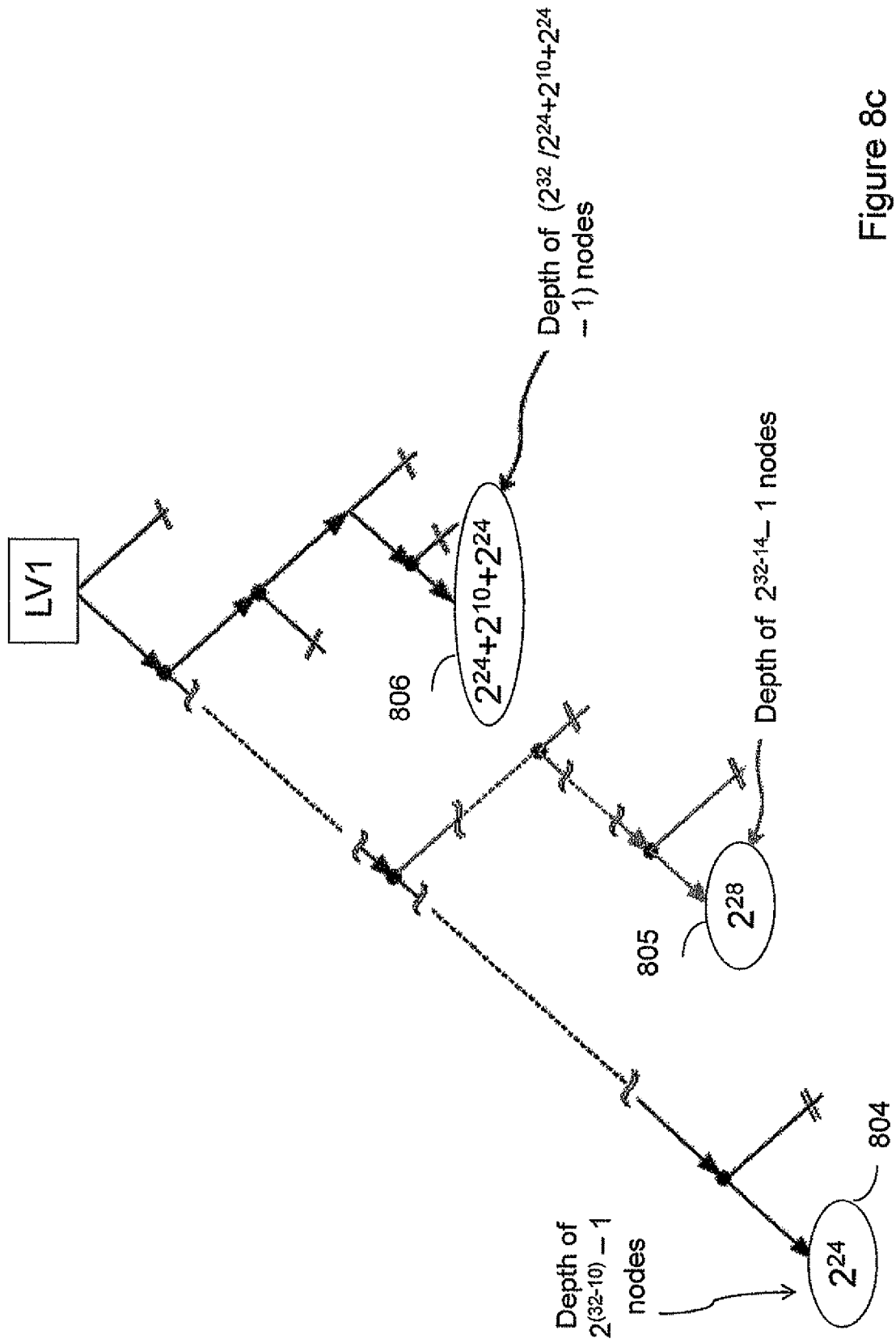

The respective allocation table is illustrated in FIG. 8b, and respective mapping tree is illustrated in FIG. 8c.

Each contiguous range of VUA addresses is represented by a leaf in the tree. The leaves in the illustrated tree indicate the following:
- The leaf 804 corresponds to the $1^{st}$ sub-range, the leaf 805 corresponds to the $2^{nd}$ (modified) sub-range, and the leaf 806 corresponds to the $3^{rd}$ sub-range. The respective depths of the leaves correspond to respective sizes of VUA sub-range. Namely, the node number of leaf 804 $k_1=(2^{32-10}-1)$, the node number of leaf 805 $k_2=(2^{32-14}-1)$, and the node number of leaf 806 $k_3=((2^{32}/(2^{24}+2^{10}+2^{14}))-1$.
- The value associated with the leaf 804 is $2^{24}$, and hence the VDA-offset is $2^{24}$. The value associated with the leaf 805 is $2^{28}$, and hence the VDA-offset of the sub-range is $2^{28}$. The value associated with the leaf 806 is $2^{24}+2^{10}+2^{14}$ which corresponds to the VDA-offset of the sub-range.
- Characteristics of a path in the tree can be translated into VUA-offset with the help of the following expression:

$$\sum_{i=0}^{d-1} r_i \cdot 2^{(M-i-1)}$$

where M is the power of two in the maximal number of admissible VUA addresses in the logical unit (in the illustrated examples M=48), d is the depth of the leaf, i=0, 1, 2, 3, d−1 are the successive nodes in the tree leading to the leaf, and $r_i$=0 for a left-hand branching, and $r_i$=for a right-hand branching.

Referring now to FIG. 9a, there is schematically illustrated a non-limiting example of mapping a range of contiguous VUA addresses to more than one corresponding ranges of VDA addresses. As illustrated, contiguous range (0,$2^{24}$) of LV1, is mapped to two different VDA ranges, namely ($2^{24}$, $2^{24}$) and ($2^{26}$,$2^{24}$) as described by corresponding allocation function with multiple allocations (referred to hereinafter as "multiple allocation function"): Multi-VDA-Alloc$_{LV1}$(0, $2^{24}$)=[($2^{24}$,$2^{24}$); ($2^{26}$,$2^{24}$)].

The corresponding mapping tree is illustrated in FIG. 9b. Leaf 901 comprises multiple references, pointing on to different VDA-offsets corresponding to two respective VDA ranges.

Figure 10A:
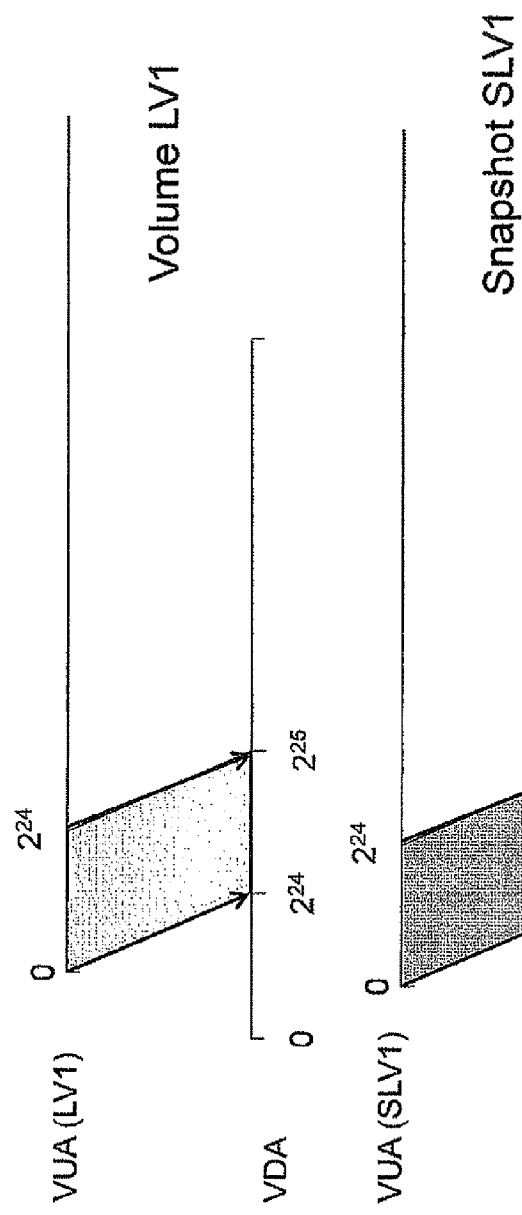

In accordance with certain embodiments of the present invention, multiple-reference leaves can be used for effectively mapping between the logical volumes and generated snapshots. FIG. 10a schematically illustrates a non-limiting example of mapping a range of contiguous VUA addresses in the volume LV1 and a range of contiguous VUA addresses in the corresponding snapshot volume SLV1 to the same range of VDA addresses. The respective allocation function for the volume LV1 is VDA-Alloc$_{LV1}$(0,$2^{24}$) ($2^{24}$;$2^{24}$); and the allocation function for the volume SLV1 is VDA-Alloc$_{SLV1}$(0, $2^{24}$)=($2^{24}$,$2^{24}$).

Figure 10B:
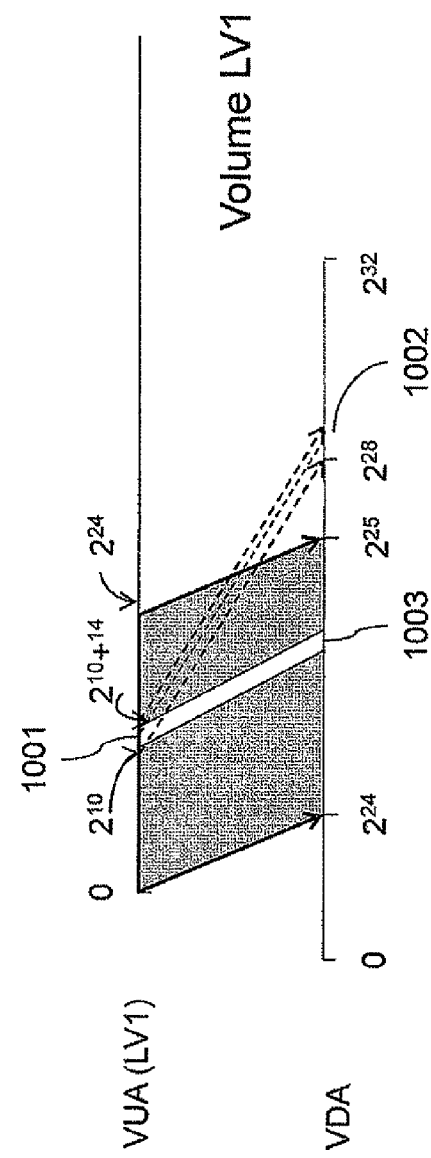

FIG. 10b schematically illustrates a non-limiting example of mapping a range of the source volume LV1 and respective snapshot volume SLV1 upon modification by a write request at VUA-offset $2^{10}$ and having a length of $2^{14}$ allocation units. Likewise, as was detailed with reference to FIG. 8a, new data 1001 associated with the source volume LV1 are allocated to a new physical location 1002 (e.g., the range starting at VDA-offset $2^{28}$ and having a length of $2^{14}$ sections). However, the snapshot SLV1 will continue pointing to the non-updated data in its location 1003. At the same time, both LV1 and SLV1 will continue to point simultaneously to the same data in the ranges outside the modified range. In terms of the allocation functions, the situation may be described as follows:

The allocation function for $1^{st}$ sub-range in LV1 is VDA-Alloc$_{LV1}$ (0,$2^{10}$)=($2^{24}$, $2^{10}$);

The allocation function for $2^{st}$ sub-range in LV1 is VDA-Alloc$_{LV1}$ (0+$2^{10}$,$2^{14}$)=($2^{28}$,$2^{14}$).

The allocation function for $3^{rd}$ sub-range in LV1 is VDA-Alloc$_{LV1}$(0+$2^{10}$+$2^{14}$,$2^{24}$−$2^{10}$−$2^{14}$)=($2^{24}$+$2^{10}$+$2^{14}$,$2^{24}$−$2^{10}$−$2^{14}$);

The allocation function for SLV1 is VDA-Alloc$_{SLV1}$ (0,$2^{24}$) ($2^{24}$,$2^{24}$).

The respective tree illustrated in FIG. 10c represents the mapping of the logical volume LV1, and at the same time mapping of respective snapshot SLV1. Likewise, the same tree may represent mapping of all snapshots generated for a given volume. Moreover, the tree represents the allocation of the data associated with the source and with the snapshot(s) after data is modified by a write request.

Each contiguous range of VUA addresses is represented by a leaf in the tree. The leaves in the illustrated tree indicate the following:

The leaf 1004 corresponds to the $1^{st}$ sub-range, the leaf 1005 corresponds to the $2^{nd}$ (modified) sub-range, and the leaf 1006 corresponds to the $3^{rd}$ sub-range. The respective depths of the leaves correspond to respective sizes of VUA sub-range. Namely, the node number of leaf 1004 k$_1$=($2^{32-10}$−1), the node number of leaf 1005 k$_2$=($2^{32-14}$−1), and the node number of leaf 1006 k3= (($2^{32}$/($2^{24}$+$2^{10}$+$2^{14}$))−1.

Likewise, as was detailed with reference to FIG. 8c, for each leaf characteristics of respective path from the root to the leaf indicate VUA-offset of the respective VUA sub-range.

The value associated with the leaf 1004 is $2^{24}$, and hence the $1^{st}$ sub-range is mapped to VDA-offset $2^{24}$. The value associated with the leaf 1005 has multiple reference. Hence the $2^{nd}$ sub-range is mapped to two locations: modified data in LV1 are mapped to VDA-offset $2^{28}$, while the old, non-modified data in the snapshot SLV1 are mapped to the old VDA-offset $2^{24}$+$2^{10}$. The value associated with the leaf 1006 is $2^{24}$+$2^{10}$+$2^{14}$ which corresponds to the VDA-offset of the sub-range.

The teachings of the present application of providing the mapping between addresses related to logical volumes and addresses related to physical storage space with the help of a mapping tree(s) configured in accordance with certain embodiments of the present invention and detailed with reference to FIGS. 6-10 are applicable for Internal-to-Physical virtual address mapping (i.e. between VUA and VDA), for direct mapping between logical and physical locations of data portions and/or groups thereof (i.e. between LBA and DBA addresses), for mapping between logical address space and virtual layer representing the physical storage space (i.e. between LBA and VDA), for mapping between virtual layer representing the logical address space and the physical address space (i.e. between VUA and DBA), etc.

Implementing the disclosed mapping trees in combination with Internal-to-Physical virtual address mapping between the virtual layers enables more efficient and smooth interaction between a very large amount of Logical Objects and a much smaller amount of actual physical storage data blocks. Among further advantages of such a combination is effective support of a snapshot and/or thin volume management mechanisms implemented in the storage system, as well as defragmentation and garbage collection processes.

Among advantages of certain embodiments comprising mapping to a virtualized physical space is a capability of effective handling continuous changes of real physical addresses (e.g. because of a failure or replacement of a disk, recalculation of the RAID parities, recovery processes, etc.). In accordance with such embodiments, changes in the real physical address require changes in mapping between PVAS and the physical storage space; however, no changes are required in the tree which maps the addresses related to logical volumes into virtual physical addresses VDA.

Among advantages of certain embodiments comprising mapping virtualized logical addresses (VUA) is a capability of effective handling of snapshots. As IVAS provides virtualization for logical volumes and snapshots, the tree may be used for simultaneous mapping of both a given logical volume and respective snapshot(s) at least until modification of the source. Likewise, in the case of thin volume, IVAS is used for immediate virtual allocation of logical volumes, and tree mapping avoids a need in an additional mechanism of gradually exporting respective addresses with the growth of the thin volume.

It should be noted that the above described storage system and method of operating thereof can be used in the framework of SAN, NAS, or any other kind of data storage approach.

It is to be understood that the subject matter is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based can readily be utilized as a basis for designing other structures, methods, and systems for carrying out the several purposes of the present invention.

It will also be understood that the system according to the invention can be a suitably programmed computer. Likewise, the invention contemplates a computer program being readable by a computer for executing the method of the invention. The invention further contemplates a machine-readable memory tangibly embodying a program of instructions executable by the machine for executing the method of the invention.

Those skilled in the art will readily appreciate that various modifications and changes can be applied to the embodiments of the invention as hereinbefore described without departing from its scope, defined in and by the claims associated with the present invention.

The invention claimed is:

1. A storage system comprising a plurality of physical storage devices constituting a physical storage space, and one or more storage control devices constituting a storage control layer, the one or more storage control devices are coupled to the plurality of physical storage devices, the storage control layer is configured to handle a logical address space divided into one or more logical groups, wherein the storage control layer further comprises an allocation module configured to provide a mapping between logical address ranges of different lengths within the logical address space and physical address ranges indicative of locations in the physical storage space, said mapping is provided by using one or more mapping trees, wherein each mapping tree of the one or more mapping trees is assigned to a logical group of the one or more logical groups and comprises one or more leaf nodes;

wherein each leaf node of the one or more leaf nodes represents a mapping between a logical address range and a physical address range;

wherein the logical address range comprises contiguous logical addresses within the logical group;

wherein a depth of each leaf node within each one of the one or more mapping trees is indicative of a length of a logical address range represented by the leaf node; and wherein a certain mapping tree of the at least one mapping trees has at least two leaf nodes that (a) represent logical address ranges of different lengths and (b) are located at different depths within the certain mapping tree.

2. The system of claim 1 wherein the logical group is selected from a group consisting of: one or more logical volumes, one or more virtual partitions, one or more snapshots, one or more combinations of a given logical volume and its respective one or more snapshots.

3. The system of claim 1 wherein the logical address space is has a plurality of logical block addresses (LBAs) and the physical storage space has a plurality of disk block addresses (DBAs), wherein the control layer further comprises a first virtual layer operable to represent the logical address space, said first virtual layer has a plurality of virtual unit addresses (VUA), and/or further comprises a second virtual layer operable to represent the physical storage space, said second virtual layer has a plurality of virtual disk addresses (VDA), and wherein mapping between the logical address ranges the physical address ranges comprises at least one of the mapping options selected from a group consisting of:
    a) mapping between LBA and DBA addresses;
    b) mapping between VUA and VDA addresses;
    c) mapping between LBA and VDA addresses; and
    d) mapping between VUA and DBA addresses.

4. The system of claim 1 wherein a given path followed from a root of a mapping tree of the one or more mapping trees to a given leaf node indicates an offset of a given logical address range that is represented by the given leaf node within the logical group; and wherein a value associated with the given leaf node is indicative of an offset of a given physical address range that is mapped to the given logical address range in the physical storage space.

5. The system of claim 4 wherein the given path is represented as a string of binary values, wherein different binary values represent right and left branches respectively that are comprised in the given path.

6. The system of claim 4 wherein the offset of the given logical address range within the logical group is calculated in accordance with the given path with the help of the following expression:

$$\sum_{i=0}^{d-1} r_i \cdot 2^{(M-i-1)}$$

where M is an exponent for representing a value of a maximum address admissible in the given logical group when used as a power of two, d is a depth of the given leaf node, successive values of i, from zero to d minus one, are successive nodes in the mapping tree leading to the given leaf node, and $r_i$ is a value equal to zero for one-side branching and equal to one for another side branching.

7. The system of claim 1 wherein a depth of a given leaf node is in inverse relation to a length of a logical address range represented by the given leaf node.

8. The system of claim 1 wherein a mapping tree of the at least one mapping trees comprises at least one leaf node with at least two associated values indicating offsets of two different physical address ranges corresponding to a same logical address range.

9. The system of claim 1 wherein the allocation module further comprises an allocation table indicating allocated and free addresses in the physical storage space, and wherein said one or more trees are associated with the allocation table.

10. A method of operating a storage system comprising a plurality of physical storage devices constituting a physical storage space, and one or more storage control devices constituting a storage control layer, coupled to a plurality of hosts and to the plurality of physical storage devices, the method comprising:
    a) representing to said plurality of hosts a logical address space divided into one or more logical groups; and
    b) mapping between logical address ranges of different lengths within the logical address space and physical address ranges indicative of locations in the physical address space, wherein said mapping comprises using one or more mapping trees, and assigning a mapping tree, that comprises one or more leaf nodes, to each logical group of the one or more logical groups;

wherein each leaf node of the one or more leaf nodes represents a mapping between a logical address range and a physical address range;

wherein the logical address range comprises contiguous logical addresses within the logical group;

wherein a depth of each leaf node within each one of the one or more mapping trees is indicative of a length of a logical address range represented by the leaf node; and wherein a certain mapping tree of the one or more mapping trees has at least two leaf nodes that (a) represent logical address ranges of different lengths and (b) are located at different depths within the certain mapping tree.

11. The method of claim 10 wherein the logical groups are selected from a group consisting of: one or more logical volumes, one or more virtual partitions, one or more snapshots, one or more combinations of a given logical volume and its respective one or more snapshots.

12. The method of claim 10 wherein:
    a) the logical address space has a plurality of logical block addresses (LBAs) and the physical storage space has a plurality of disk block addresses (DBAs);
    b) the control layer further comprises a first virtual layer operable to represent the logical address space, said first virtual layer has plurality of virtual unit addresses (VUA), and/or further comprises a second virtual layer operable to represent the physical storage space, said second virtual layer has plurality of virtual disk addresses (VDA), and
    c) mapping between the logical address and the physical address ranges comprises at least one of the mapping options selected from a group consisting of:

d) mapping between LBA and DBA addresses;
e) mapping between VUA and VDA addresses;
f) mapping between LBA and VDA addresses; and
g) mapping between VUA and DBA addresses.

13. The method of claim 10 wherein a given path followed from a root of a mapping tree of the one or more mapping trees to a given leaf node indicates an offset of a given logical address range represented by the given leaf node within the logical group; and a value associated with the given leaf node indicates an offset of a given physical address range that is mapped to the given logical address in the physical storage space.

14. The method of claim 13 wherein the given path is represented as a string of binary values, wherein different binary values represent right and left branches respectively that are comprised in the given path.

15. The method of claim 13 wherein the offset of the given logical address range within the logical group is calculated in accordance with the given path with the help of the following expression:

$$\sum_{i=0}^{d-1} r_i \cdot 2^{(M-i-1)}$$

where M is an exponent for presenting a value of a maximum address in the logical group when used as a power of two, d is a depth of the given leaf node, successive values of i, from zero to d minus one are successive nodes in the mapping tree leading to the given leaf node, and ri is a value equal to zero for one-side branching and equal to one for another side branching.

16. The method of claim 10 wherein a depth of a given leaf node is in inverse relation to a length of a logical address range represented by the given leaf node.

17. The method of claim 10 wherein a mapping tree of the one or more mapping trees comprises at least one leaf node with at least two associated values indicating offsets of two different physical address ranges corresponding to a same logical address range.

18. A non-transitory computer readable medium that stores computer program code that once executed on a computer causes the computer to perform:
   representing, by a storage system to a plurality of hosts, a logical address space divided into one or more logical groups; and
   b) mapping between logical address ranges of different lengths within the logical address space and physical address ranges indicative of locations in a physical address space that comprises one or more physical storage devices, wherein said mapping comprises using one or more mapping trees, and assigning a mapping tree, that comprises one or more leaf nodes, to each logical group of the one or more logical groups;
   wherein each leaf node of the one or more leaf nodes represents a mapping between a logical address range and a physical address range;
   wherein the logical address range comprises contiguous logical addresses within the logical group;
   wherein a depth of each leaf node within each one of the one or more mapping trees is indicative of a length of a logical address range represented by the leaf node; and
   wherein a certain mapping tree of the one or more mapping trees has at least two leaf nodes that (a) represent logical address ranges of different lengths and (b) are located at different depths within the certain mapping tree.

* * * * *